United States Patent
Yamashita et al.

(10) Patent No.: US 6,882,934 B2
(45) Date of Patent: Apr. 19, 2005

(54) APPARATUS AND METHOD FOR DISPLAYING MAP

(75) Inventors: Atsushi Yamashita, Osaka (JP); Kiyomi Sakamoto, Ikoma (JP); Hiroyuki Hamada, Yawata (JP); Yuji Hamada, Yokohama (JP); Keiichi Takahashi, Yokohama (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 115 days.

(21) Appl. No.: 10/384,553

(22) Filed: Mar. 11, 2003

(65) Prior Publication Data

US 2003/0176966 A1 Sep. 18, 2003

(30) Foreign Application Priority Data

Mar. 14, 2002 (JP) .......................... 2002-070762

(51) Int. Cl.$^7$ ............................................. G06C 21/00
(52) U.S. Cl. ....................... 701/208; 701/209; 701/211; 701/212; 340/988
(58) Field of Search ................................ 701/208, 209, 701/211, 212

(56) References Cited

U.S. PATENT DOCUMENTS 6,452,544 B1 * 9/2002 Hakala et al. .......... 342/357.13

FOREIGN PATENT DOCUMENTS

| JP | 10-089990 | | 4/1998 | |
| JP | 10253380 A | * | 9/1998 | .......... G01C/21/00 |
| JP | 2000-112343 | | 4/2000 | |
| JP | 2001-027535 | | 1/2001 | |

* cited by examiner

Primary Examiner—Y. Beaulieu
(74) Attorney, Agent, or Firm—Wenderoth, Lind & Ponack, L.L.P.

(57) ABSTRACT

A map displaying apparatus for improving the visual recognition of an object displayed as a 3D image. A map data acquisition section acquires map data to be displayed for navigation purposes. A displayed state estimation section receives the map data acquired by the map data acquisition section, and estimates a displayed state of the displayed object based on the map data. A display mode determination section determines whether the displayed state as estimated by the displayed state estimation section satisfies a predetermined criterion or not, thereby determining whether to modify a default display mode. When determining that a modification is to be applied, the display mode determination section modifies the default display mode to determine an actual display mode. In accordance with the determined display mode of each displayed object, the displayed image generation section generates image data for displaying a 3D map from the acquired map data.

32 Claims, 20 Drawing Sheets

71  72  73    75    76   74

81  82        84

81  82        84

APPARATUS AND METHOD FOR DISPLAYING MAP

BACKGROUND OF THE INVENTION

1. Field of the Invention

The present invention relates to a map displaying apparatus, and more particularly to a three-dimensional map displaying apparatus which displays routes on a three-dimensional map.

2. Description of the Background Art

There has been a class of map displaying apparatuses (such as navigation apparatuses) which allow two-dimensional (2D) map data to be viewed from different viewpoints, or which display a map in a three-dimensional manner based on three-dimensional (3D) map data which is previously constructed from polygons. Hereinafter, such apparatuses will be referred to as "3D map displaying apparatuses". A 3D map displaying apparatus permits a user to have an intuitive understanding of a map. FIG. 21 is a diagram illustrating an exemplary image displayed by a conventional 3D map displaying apparatus. As seen from FIG. 21, a 3D map displaying apparatus can provide a realistic image representation.

Some 3D map displaying apparatuses have the function of searching for an optimum route based on a start point and a destination point which have been set by a user and displaying a found route so as to be overlaid on a 3D map, and/or the function of receiving neighborhood traffic information by the use of communication means and displaying congested sites and closed sites, if any, so as to be overlaid on a 3D map. Displaying a three-dimensional map on an apparatus having such functions is especially useful because it permits a user to have an intuitive understanding of the routes and traffic information. For example, there are techniques for displaying a 3D map such that guide lines indicating routes or road information are displayed with a perspective "depth", in an effort to provide for a better visual recognition.

According to the aforementioned techniques, every route that is displayed on the screen is displayed so as to appear upright (i.e., appear to have a "height" dimension"). In other words, not only routes extending along the right-left direction on the on the screen but also routes extending along the "depth" direction on the screen are displayed so as to appear upright, although the latter routes are generally not difficult to recognize and therefore do need not to be displayed so as to appear upright. What is worse, routes extending along the depth direction may actually become more difficult to recognize when appearing upright. Moreover, the aforementioned techniques are directed to providing upright displayed images of routes and road information, and therefore cannot improve the visual recognition of any other displayed objects, e.g., roads, train stations, and the like.

Furthermore, according to the above-described three-dimensional displaying techniques, any length along the depth direction of the screen will appear disproportionately short. This makes it very difficult to recognize any displayed objects (e.g., roads or routes) extending along the right-left direction of the display screen, which in turn makes it difficult for the user to properly understand the displayed information. For example, in the example shown in FIG. 21, roads extending along the right-left direction of the display screen (i.e., roads 71 to 74) appear so narrow that they may be difficult to recognize. Therefore, the user may overlook any number of the roads to take right or left at from an intersection, or the user may lose track of the roads on a displayed route. Similarly, a train station 76 extending along the right-left direction of the display screen appears so narrow that it may be difficult to recognize. Thus, according to the conventional 3D map displaying techniques, the objects displayed as 3D images may become difficult to visually recognize, such that the user cannot properly understand the displayed map.

A method for solving the above problem might be to set broad widths in the map data, or elevate the viewpoint on the screen. However, setting broad road widths in the map data itself would cause, not only the roads extending along the right-left direction of the screen, but also those extending along the depth direction to appear broad. For example, as shown in FIG. 21, a road 75 extending along the "depth" direction also appears broad, although such a road 75 is relatively easy to recognize without being provided with such a broad width. If any other displayed objects are present on the sides of a road extending along the depth direction, a broadened road width will be in an overlapping relationship with the other displayed objects, whereby the other displayed objects may become all the more difficult to recognize. On the other hand, elevating the view point on the screen is in itself a limitation on the viewpoint, which makes it difficult to represent a realistic map that is taken from a viewpoint similar to the user's viewpoint. Thus, there has been no effective conventional means for improving the recognition of those displayed objects whose recognizability worsens when displayed as 3D images.

SUMMARY OF THE INVENTION

Therefore, an object of the present invention is to provide a map displaying apparatus which provides improved visual recognition of objects displayed as 3D images.

The present invention has the following features to attain the above object.

A first aspect of the present invention is directed to a map displaying apparatus for displaying a 3D map on a screen, the 3D map being displayed as viewed from a viewpoint, comprising: a regular display section for displaying an object (e.g., a route object 93 shown in FIG. 18) extending along a reference road (e.g., a road 95 shown in FIG. 18) so as to be drawn on a ground plane of the 3D map, the reference road being a road passing below the viewpoint and extending along a top-bottom direction of the screen; and an emphasis display section for displaying an object extending along a branch road (e.g., a road 94 shown in FIG. 18), wherein, the branch road is defined such that a smaller one of angles between the branch road and the reference road is equal to or greater than a predetermined value, and the object extending along the branch road is of a type identical to the type of the object extending along the reference road and comprises an object (e.g., a route object 92 shown in FIG. 18) having a height with respect to the ground plane.

According to the first aspect, a reference road, which will not suffer from deteriorated recognizability, is not displayed so as to appear upright. On the other hand, a branch road, which will suffer from deteriorated recognizability, is displayed so as to appear upright. As a result, the visual recognition of objects which are in a displayed state susceptible to deteriorated recognizability (e.g., branch roads) can be enhanced. Moreover, the recognizability of objects which are in a displayed state not susceptible to deteriorated recognizability (e.g., the reference road) is kept intact. Thus, according to the first aspect, a map displaying apparatus is provided which can improve the visual recognition of displayed objects on a 3D map.

Moreover, according to the first aspect, an enhanced visual recognition is provided by displaying objects so as to have a "height" with respect to the ground plane. Note that one cause for a deteriorated recognizability of a 3D displayed image is an insufficient "depth" dimension (i.e., dimension along the top-bottom direction of the screen). Therefore, by conferring a "height" with respect to the ground plane to a displayed object, it becomes possible to secure a sufficient dimension along the top-bottom direction of the screen. Thus, by modifying displayed objects so as to appear upright, visual recognition can be effectively enhanced.

In one embodiment, the map displaying apparatus further comprises: a map data acquisition section for acquiring map data including display data for displaying a 3D map; and a modification section for modifying display data representing the object extending along the branch road so as to be displayed as an object having a height with respect to the ground plane, wherein, the regular display section displays the object extending along the reference road by using the display data as acquired by the map data acquisition section, and the emphasis display section displays the object extending along the branch road by using the display data as modified by the modification section.

Thus, objects which are to be displayed in an emphasized manner in order to improve visual recognition are generated based on the display data used for regular displaying. Since there is no need to separately provide shapes used for emphasized displaying in addition to the shapes used for regular displaying, it is easy to achieve emphasized displaying.

In another embodiment, the map displaying apparatus further comprises: a first angle calculation section for calculating an angle between the reference road and a road connected to the reference road; and a branch road determination section for determining whether the road connected to the reference road is a branch road or not based on the angle calculated by the first angle calculation section.

Thus, the determination of branch roads can be made easily and accurately. As a result, an easy and accurate determination as to whether a given object needs to have its visual recognition improved or not can be made.

In still another embodiment, the map displaying apparatus further comprises: a second angle calculation section for calculating an angle between a sightline from the viewpoint and a road connected to the reference road, the angle being taken in the ground plane; and a branch road determination section for determining whether the road connected to the reference road is a branch road or not based on the angle calculated by the second angle calculation section.

Thus, as in the case of employing a first angle calculation section, the determination of branch roads can be made easily and accurately. As a result, an easy and accurate determination as to whether a given object needs to have its visual recognition improved or not can be made.

In still another embodiment, the emphasis display section modifies a display mode of the object having the height with respect to the ground plane in accordance with the angle between the reference road and the branch road.

Thus, an object extending along a branch road will have its display mode modified in accordance with an angle between the branch road and the reference road, i.e., the displayed orientation. As used herein, "modifications" of the display mode may encompass, for example, changes in the color, size, or the like of a displayed object, and in the case where a plurality of displayed objects are employed in a collective manner, changes in the number of such displayed objects and the intervals therebetween. There has been a problem in that a displayed object having a "height" with respect to the ground plane may undergo large variations in its display mode, depending on whether its displayed orientation is close to the right-left direction of the screen or the depth direction. Therefore, by modifying the display mode depending on the displayed orientation in a manner to solve the above problem, it becomes possible to further enhance the visual recognition of displayed objects having a "height" with respect to the ground plane.

In still another embodiment, the emphasis display section may modify a display mode of the object having the height with respect to the ground plane in accordance with a depression angle between the sightline and the ground plane. Alternatively, the emphasis display section may modify the display mode of the object having the height with respect to the ground plane, so that a face of the object having the height with respect to the ground plane is perpendicular to the sightline.

Thus, a displayed object extending along a branch road has its display mode modified in accordance with the depression angle. As used herein, "modifications" of the display mode may encompass, for example, changes in the color, size, three-dimensional posture (tilt), or the like of a displayed object. For example, by changing the posture of a displayed object in accordance with the depression angle so that a face of the displayed object is always perpendicular to the sightline, the recognizability of the displayed object never worsens irrespective of the depression angle. Therefore, by modifying the display mode in accordance with the depression angle, it becomes possible to further enhance the visual recognition of displayed objects having a "height" with respect to the ground plane.

In still another embodiment, the objects are route objects representing a route from a start point to a destination point, and the emphasis display section displays the route object extending along the branch road so as to comprise an object having a height with respect to the ground plane and indicating a forward direction of the route. As the route object, the emphasis display section at least may display a plurality of arrowheads pointing to the forward direction of the route and arrayed above the road.

In still another embodiment, the objects are traffic information objects representing traffic information, and the emphasis display section displays the traffic information object concerning the branch road so as to comprise an object having a height with respect to the ground plane and indicating a direction relevant to the traffic information. As the route object, the emphasis display section may at least display a plurality of arrowheads pointing to the direction relevant to the traffic information and arrayed above the road.

Thus, route objects are displayed in a shape pointing to the forward direction of a route. Alternatively, traffic information objects are displayed in shapes pointing to the direction relevant to the traffic information (i.e., a congested direction of the traffic). By displaying such images, the user can not only easily understand the locations of routes and sites to which traffic information is directed, but also easily understand the forward direction of the route and the content of the traffic information. In particular, in the case of arrowhead objects, the problem of one displayed object having a "height" with respect to the ground plane concealing another displayed object lying behind can be improved as compared to the case where the displayed object is drawn as one upright shape.

A second aspect of the present invention is directed to a map displaying apparatus for displaying a 3D map on a screen, the 3D map being displayed as viewed from a viewpoint, comprising: a map data acquisition section for acquiring map data including display data for displaying a 3D map; a modification section for modifying the display data with respect to a selected one of road objects representing roads contained in the 3D map and/or objects extending along the roads so that the selected object has an increased width; and a display section for displaying a 3D map containing the selected object (e.g., roads 71 to 74 shown in FIG. 7) whose width has been increased by the modification section.

Thus, according to the second aspect, the map displaying apparatus modifies selected displayed objects so as to appear with a width which is increased from what is designated in the display data. Therefore, display data can be modified selectively for objects which are in a displayed state susceptible to deteriorated recognizability (e.g., displayed objects extending along the lateral direction of the screen), thereby providing an enhanced visual recognition. Thus, according to the second aspect, only displayed objects for which modification would be effective will have their width modified. As a result, a map displaying apparatus is provided which can improve the visual recognition of displayed objects on a 3D map.

In one embodiment, the map displaying apparatus further comprises an orientation calculation section for calculating orientations in which to display the road objects and/or the objects extending along the roads oh the screen, wherein the modification section determines whether or not to increase the width of an object based on the orientation calculated by the orientation calculation section.

Thus, the width of a displayed object is changed in accordance with the orientation in which the object is displayed. Note that the recognizability of a displayed object in a 3D displayed image largely depends on the orientation in which the object is displayed. In other words, an object extending along the lateral direction of the screen will suffer from much deteriorated recognizability when displayed as a 3D image, whereas an object extending along the top-bottom direction of the screen does not have its recognizability substantially affected when displayed as a 3D image. Thus, by calculating the orientation in which an object is displayed as the displayed state thereof, it is possible to accurately determine displayed objects which are susceptible to deteriorated recognizability, whereby the visual recognition of displayed objects can be further improved.

In another embodiment, the orientation calculation section calculates as the orientation an angle between a sightline from the viewpoint and each road object and/or object extending along the road, the angle being taken in the ground plane.

Thus, the displayed orientation of an object is expressed in terms of an angle between the sightline and the displayed object in the ground plane (horizontal angle). Since the displayed state of each displayed object is expressed in terms of a specific numerical value, displayed objects which are susceptible to deteriorated recognizability can be determined more accurately.

In still another embodiment, the map displaying apparatus further comprises a deformation degree calculation section for calculating a deformation degree to which the display data is modified, wherein the modification section determines an amount of modification to be applied to the display data in accordance with the deformation degree.

Thus, the amount of modification to be applied is expressed in terms of a deformation degree, such that the modification amount is varied in accordance with the deformation degree. As a result, it is possible to determine not only whether or not to apply modification, but to which degree a modification is to be applied, thereby enabling more subtle modifications.

The map displaying apparatus further comprises an orientation calculation section for calculating orientations in which to display the road objects and/or the objects extending along the roads on the screen, wherein the deformation degree calculation section calculates the deformation degree based on the orientation calculated by the orientation calculation section.

Thus, the amount of modification to be applied to a displayed object is varied in accordance with the horizontal angle between the sightline and the displayed object. A displayed object which has a large horizontal angle is oriented in the lateral direction, and therefore will suffer from deteriorated recognizability. On the other hand, a displayed object which has a small horizontal angle is oriented in the top-bottom direction, and therefore will not suffer from deteriorated recognizability. Thus, the horizontal angle can serve as an index of susceptibility to deteriorated recognizability. Therefore, by varying the modification amount in accordance with the horizontal angle, the amount of modification to be applied can be varied in accordance with susceptibility to deteriorated recognizability. As a result, displayed objects which are susceptible to deteriorated recognizability can be determined more accurately, whereby the visual recognition of displayed objects can be further improved.

In still another embodiment, the deformation degree calculation section calculates the deformation degree based on a depression angle between the sightline and the ground plane.

Thus, the amount of modification to be applied to a displayed object is varied in accordance with the depression angle between the sightline and the ground plane. If the sight line has a large depression angle, the viewpoint is at a relatively high position over the 3D displayed image, and therefore recognizability is not substantially deteriorated. On the other hand, if the sight line has a small depression angle, the viewpoint is at a relatively low position over the 3D displayed image, causing a considerable deterioration in recognizability of displayed objects. Thus, the depression angle can serve as an index of susceptibility to deteriorated recognizability. Therefore, by varying the modification amount in accordance with the depression angle, the amount of modification to be applied can be varied in accordance with susceptibility to deteriorated recognizability. As a result, displayed objects which are susceptible to deteriorated recognizability can be determined more accurately, whereby the visual recognition of displayed objects can be further improved.

In still another embodiment, the deformation degree calculation section calculates the deformation degree based on a distance from the viewpoint to the object.

Thus, the amount of modification to be applied to a displayed object is varied in accordance with the distance of the displayed object from the view point. A displayed object which is at a large distance from the view point appears small in size, and therefore will suffer from deteriorated recognizability. On the other hand, a displayed object which is at a small distance from the view point angle appears large in size, and therefore will not suffer from deteriorated recognizability. Therefore, by varying the modification amount based on this relationship, the amount of modification to be applied can be varied in accordance with susceptibility to deteriorated recognizability. As a result, displayed objects which are susceptible to deteriorated recognizability can be determined more accurately, whereby the visual recognition of displayed objects can be further improved.

There is a comparatively little need for the user to recognize a displayed object which is at a large distance from the view point. On the other hand, there is a comparatively large need for the user to recognize a displayed object which is at a small distance from the view point. Therefore, by varying the modification amount based on this relationship, displayed objects whose visual recognition needs to be improved can be accurately determined, whereby the visual recognition of displayed objects can be effectively improved.

In still another embodiment, the map data contains type information representing a type of each object, and the deformation degree calculation section calculates the deformation degree based on the type information.

Thus, the amount of modification to be applied to a displayed object is varied in accordance with the types of displayed objects. As used herein, the "type" of a displayed object is a notion encompassing the category of the displayed object (e.g., a road or a facility), as well as subcategories within the same category (e.g., a national route or a prefectural route). Thus, the visual recognition of selected displayed objects on the screen can be improved. For example, the displayed objects to be modified can be selected in accordance with the needs of the user (e.g., purposes of use). As a result, displayed objects whose visual recognition needs to be improved can be accurately determined, whereby the visual recognition of displayed objects can be effectively improved.

In still another embodiment, the map displaying apparatus further comprises a route information acquisition section for acquiring route information indicating a route from a start point to a destination point, wherein the deformation degree calculation section calculates the deformation degree based on the route information.

Thus, the amount of modification to be applied to a displayed object is varied depending on whether the displayed object is located on a route or not, or in accordance with the distance along the route, for example. Routes are particularly important information among all the objects displayed on the screen. Therefore, by varying the amount of modification based on the route, displayed objects whose visual recognition needs to be improved can be accurately determined, whereby the visual recognition of displayed objects can be effectively improved.

In still another embodiment, the map displaying apparatus further comprises: an interference determination section for determining whether there are overlapping objects or not based on the display data modified by the modification section; and an interference cancellation section for controlling the display section, when the interference determination section determines that there are overlapping objects, to display at least one of the overlapping objects so as not to overlap the other object.

In still another embodiment, when the interference determination section determines that there are overlapping objects, the interference cancellation section changes a width of at least one of the overlapping objects so as not to overlap the other object. Alternatively, when the interference determination section determines that there are overlapping objects, the interference cancellation section may change a displayed position of at least one of the overlapping objects so as not to overlap the other object. Alternatively, when the interference determination section determines that there are overlapping objects, the interference cancellation section may control the display section to display only one of the overlapping objects.

Thus, in the case where displayed objects overlap each other because of increased widths thereof, one or both of the overlapping displayed objects are adjusted. Note that the purpose of enhancing visual recognition by using increased widths would be defeated if displayed objects interfere (e.g., overlap) with one another. Thus, there is a desire to prevent interference between displayed objects. The adjustment for canceling interference can be made by changing widths, or changing displayed positions. One of the overlapping displayed objects may be simply prevented from being displayed. In particular, by changing widths, interferences between displayed objects can be prevented without changing the displayed positions of the displayed objects. In the case where displayed positions are changed, the widths of the overlapping displayed objects are retained, so that the recognizability of both displayed objects will remain intact. In the case where one of the overlapping displayed objects is simply prevented from being displayed, the recognizability of the displayed object will remain intact.

A third aspect of the present invention is directed to a map displaying method for displaying a 3D map on a screen, the 3D map being displayed as viewed from a viewpoint, comprising: a regular display step of displaying an object extending along a reference road so as to be drawn on a ground plane of the 3D map, the reference road being a road passing below the viewpoint and extending along a top-bottom direction of the screen; and an emphasis display step of displaying an object extending along a branch road, wherein, the branch road is defined such that a smaller one of angles between the branch road and the reference road is equal to or greater than a predetermined value, and the object extending along the branch road is of a type identical to the type of the object extending along the reference road and comprises an object having a height with respect to the ground plane.

A fourth aspect of present invention is directed to a map displaying method for displaying a 3D map on a screen, the 3D map being displayed as viewed from a viewpoint, comprising: a map data acquisition step of acquiring map data including display data for displaying a 3D map; a modification step of modifying the display data with respect to a selected one of road objects representing roads contained in the 3D map and/or objects extending along the roads so that the selected object has an increased width; and a display step of displaying a 3D map containing the selected object whose width has been increased by the modification step.

A fifth aspect of the present invention is directed to a program for causing a computer to execute the method according to the third or fourth aspect. In other words, the present invention can be implemented as a program. Through the use of a recording medium on which such a program is recorded, it becomes possible to embody the present invention on an independent computer system.

These and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a graph illustrating another relationship between a distance 1 and a distance deformation degree D3 according to a second variant of the first embodiment of the present invention;

DESCRIPTION OF THE PREFERRED EMBODIMENTS

Figure 1:
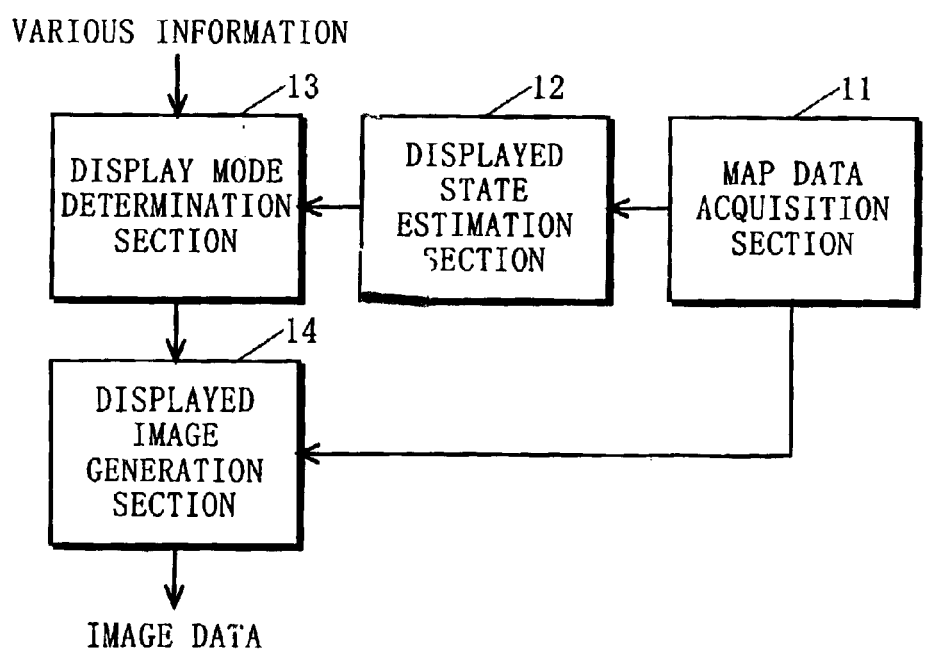
FIG. 1 is a functional block diagram illustrating the structure of a navigation apparatus according to an embodiment of the present invention.

First, the general principles of the present invention will be described with reference to FIG. 1. FIG. 1 is a functional block diagram illustrating the structure of a navigation apparatus according to an embodiment of the present invention. The following descriptions will illustrate a case where the 3D map displaying apparatus is implemented as a navigation apparatus. In FIG. 1, the navigation apparatus comprises a map data acquisition section 11, a displayed state estimation section 12, a display mode determination section 13, and a displayed image generation section 14. Hereinafter, the respective components of the navigation apparatus will be described.

The map data acquisition section 11 acquires map data to be displayed for navigation purposes. The map data may be acquired from a memory device within the navigation apparatus, or externally acquired by means of a communications device included in the navigation apparatus. The map data contains information concerning displayed objects. As used herein, a "displayed object" is any object which is displayable on the screen. Examples of displayed objects include: roads and facilities representing map information; routes; and displayed objects representing various traffic information, such as "congestion" or "under construction". A piece of map data directed to displaying a "road"object contains data concerning the position and direction of the road, as well as data concerning the width of the road (which becomes necessary when displaying the road as a 3D image). A piece of map data directed to displaying a "train station" or various other "facility" object contains data concerning the position and shape of such. The map data is outputted to the displayed state estimation section 12 and the displayed image generation section 14.

For a predetermined displayed object(s), the displayed state estimation section 12 and the display mode determination section 13 modify the display data so as to increase the width of the displayed object. As used herein, "display data" is a portion of map data which is used for displaying a map. Specifically, the displayed state estimation section 12 receives the map data acquired by the map data acquisition section 11, and estimates a displayed state of the displayed object based on the map data. As used herein, the "displayed state" of a displayed object is a notion encompassing the displayed size and/or shape of a displayed object, the orientation of the displayed object on the screen (e.g., depth direction or the right-left direction of the screen), and so on. The displayed state of a displayed object also encompasses information as to whether a given road or route is located where it would be passed through if the vehicle incorporating the navigation apparatus proceeded from the current location in the forward direction or not, and information as to whether a given route extends beyond a next deformation-start intersection or not. The result of the estimation by the displayed state estimation section 12 is outputted to the display mode determination section 13.

The display mode determination section 13 determines whether the displayed state of each displayed object as estimated by the displayed state estimation section 12 satisfies a predetermined criterion or not, thereby determining whether to modify a default display mode or not. The predetermined criterion is used to determine whether or not to modify the default display mode. The predetermined criterion may be, for example, for an object to be displayed on the screen in the right-left direction of the screen ("lateral direction"), for a road or route to be not located where it would be passed through if the vehicle incorporating the navigation apparatus proceeded from the current location in the forward direction, or for a road or route to extend beyond a next deformation-start intersection on a given route.

As used herein, the "default display mode" is a predetermined display mode which is defined in the map data with respect to each displayed object. The default display mode, which is a mode existing before any modification is applied by the display mode determination section 13, is not necessarily the same as the actual mode in which an object is displayed as a 3D image on the screen. As an example, for any displayed object extending in an oblong shape along a lateral direction, the display mode determination section 13 may modify the display mode thereof by changing the width of the displayed object.

Furthermore, when determining that a modification is to be applied, the display mode determination section 13 modifies the default display mode to determine an actual display mode. As used herein, the "actual display mode", which is obtained as a result of applying a modification to the default display mode, is a display mode in which an object is displayed as a 3D image on the screen. On the other hand, when determining that a modification is not to be applied, the display mode determination section 13 uses the default display mode as the actual display mode. In the following embodiments, the display mode determination section 13 determines the actual display mode based not only on the displayed state of each displayed object as estimated by the displayed state estimation section 12, but also on various kinds of information, such as including route information and sightline information.

In accordance with the display mode of each displayed object as determined by the display mode determination section 13, the displayed image generation section 14 generates image data for displaying a 3D map from the map data acquired by the map data acquisition section 11. The image data is inputted to a display device (not shown), which displays a three-dimensional map image as viewed from a given viewpoint.

In accordance with the configuration as summarized above, the navigation apparatus according to the present invention can improve the visual recognition of a displayed object in a 3D displayed image. For example, if it is determined based on the estimation by the displayed state estimation section 12 that a given road to be displayed is oriented in the lateral direction of the screen, the display mode determination section 13 may modify the actual display mode so as to increase the width of the road, thereby improving the visual recognition of the road extending along the lateral direction.

The above description which has been made with reference to FIG. 1 is given only for the purpose of facilitating the understanding of the fundamental principles of the present invention, and is not to be construed as any limitation on the scope of the claims.

First Embodiment

Now, a first embodiment of the present invention will be described. In the first embodiment, it is estimated whether a displayed object such as a road is oriented in the lateral direction of the screen or not. For any displayed object which is determined as being oriented in the lateral direction, the actual display mode of the displayed object is modified so as to increase the width of the displayed object. As a result, the navigation apparatus according to the first embodiment improves the visual recognition of roads extending along the lateral direction.

Figure 2:
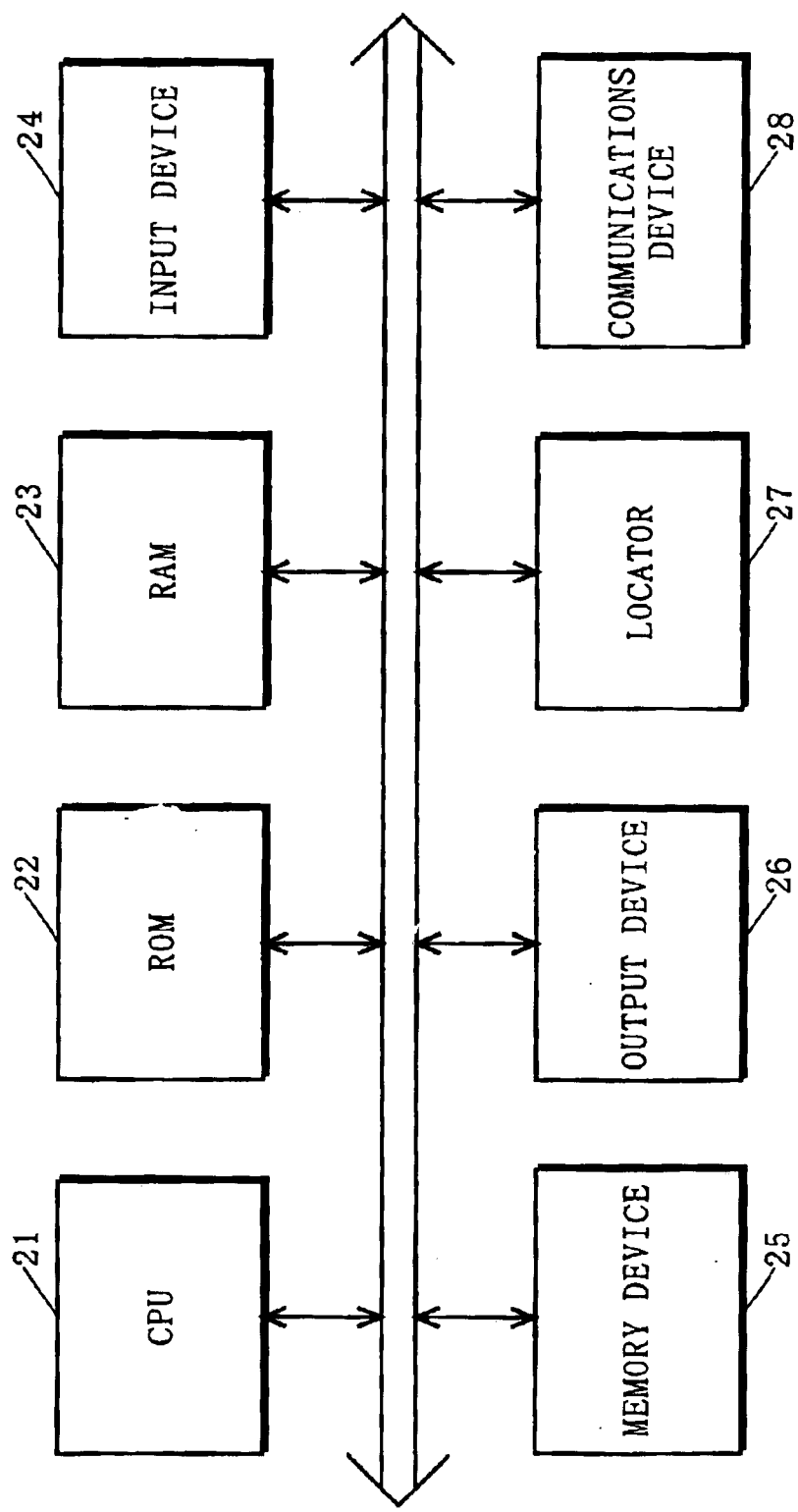
FIG. 2 is a diagram illustrating the hardware structure of a navigation apparatus according to a first embodiment of the present invention.

FIG. 2 is a diagram illustrating the hardware structure of the navigation apparatus according to the first embodiment of the present invention. The navigation apparatus according to the present embodiment, which is directed for use in automobiles, comprises a CPU 21, a ROM 22, a RAM 23, a memory device 25, an input device 24, an output device 26, a locator 27, and a communications device 28.

The ROM 22, which is a program memory, has previously recorded therein a program for performing predetermined processes designed for the navigation apparatus. After the navigation apparatus is activated, the CPU 21 executes the program in the ROM 22. The respective functional blocks shown in FIG. 1 are realized by the CPU 21 executing this program. While performing the program, the CPU 21 utilizes the RAM 23 as a work area.

The memory device 25, which is typically composed of a DVD drive, a CD drive, a hard disk drive, or an IC memory, stores a map database. The map database stored in the memory device 25, which may be of any known type, includes a set of map data in the form of one or more files. The map data usually contains display data, based on which a map image is displayed by the display device, and road network data, which represents interconnections between the roads on the map. The display data contains data representing the position and orientation of each displayed object, as well as data concerning road widths which becomes necessary when displaying the road as a 3D image. For a "train station" or other kind of "facility" object, the display data contains data representing the position and shape thereof.

As used herein, a "map" is a planar representation of a terrain, drawn to a predetermined scale and employing text and various map symbols. Typical examples of map formats are a bird's eye view and a plan view. A bird's eye view is a planar representation of a three-dimensional terrain as looked down from the sky. A plan view is a diagram obtained by projecting onto a plane the objects which are on a terrain. In a plan view, each object takes a shape as it is looked down from immediately above. Although the present invention is directed to representing a three-dimensional map image (including a bird's eye view), the navigation apparatus according to the present embodiment may be designed so as to be capable of switching between a three-dimensional displaying mode and a two-dimensional displaying mode (in the form of a plan view) based on user instructions.

The aforementioned road network data, which in itself is well known and any description thereof is omitted, is composed of nodes representing intersections and links representing roads, and as a whole is indicative of interconnections in a road network.

The input device 24 is typically composed of a remote control, a touch sensor, keys, buttons, or a mouse which is operated by a user's hand, or a microphone through which a user makes an audio input. In accordance with the design and specifications of the navigation apparatus, the input device 24 may be composed of two or more elements selected from a remote control, a touch sensor, keys, buttons, a mouse, and a microphone.

The output device 26, which is typically composed of a display device and a loudspeaker, outputs various data generated by the CPU 21 to the user. Each of these data will be described later.

The locator 27, which is composed of a GPS (Global Positioning System) receiver, orientation sensor, and velocity sensor, detects the current location of the user, and generates user location information representing the coordinates of the current location. The user location information is sent to the CPU 21.

The communications device 28, which is typically composed of a VICS (Vehicle Information and Communication System) receiver, receives traffic information from beacons installed near the roads. In the present embodiment, "traffic information" is defined as information which identifies sites of traffic congestions and traffic accidents in terms of coordinates. The communications device 28 may be configured so as to internalize a cellular phone in itself so as to confer an Internet connecting function to the navigation apparatus.

Figure 3:
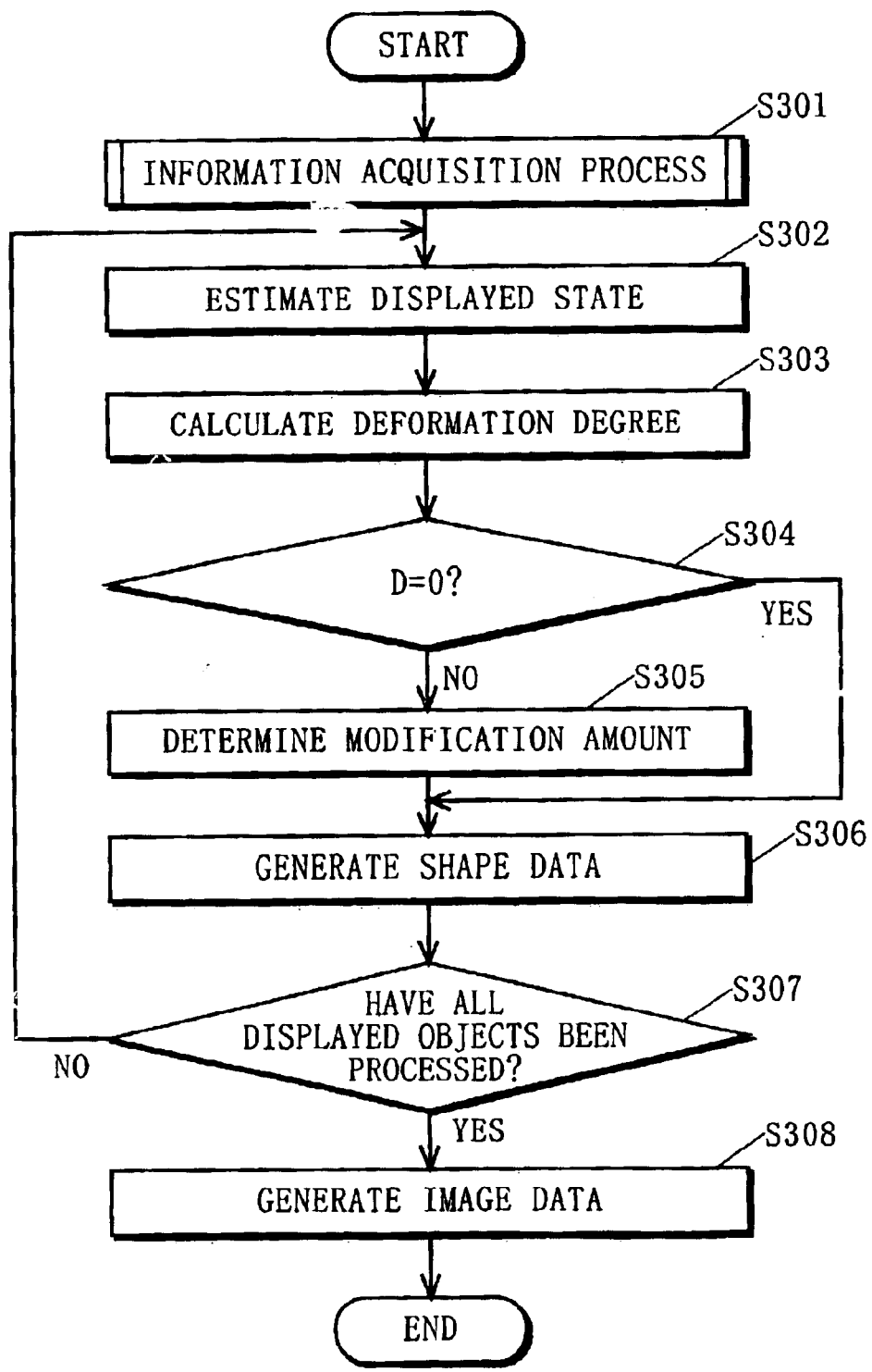
FIG. 3 is a flowchart illustrating a processing procedure of a CPU 21 as described in a program for the navigation apparatus according to the first embodiment of the present invention.

Next, an operation of the navigation apparatus according to the first embodiment will be described. Once the navigation apparatus is activated, the CPU 21 performs the program recorded in the ROM 22. FIG. 3 is a flowchart illustrating a processing procedure of the CPU 21 as described in the program.

First, the CPU 21 acquires various kinds of information to be used for determining the display mode (step S301). Specifically, the CPU 21 acquires user location information, route information, and sightline information, as well as map data. As used herein, "user location information" is information indicating a current location of a user, typically represented in the form of coordinates on a map. "Route information" is information indicating a route which is found as a result of a route search that is performed by the present navigation apparatus, typically represented as a link data sequence contained in map data. "Sightline information" is information indicating a sightline from a viewpoint of a 3D displayed image on the screen. Hereinafter, a process for acquiring various kinds of information in the subroutine of step S301 will be described in detail.

Figure 4:
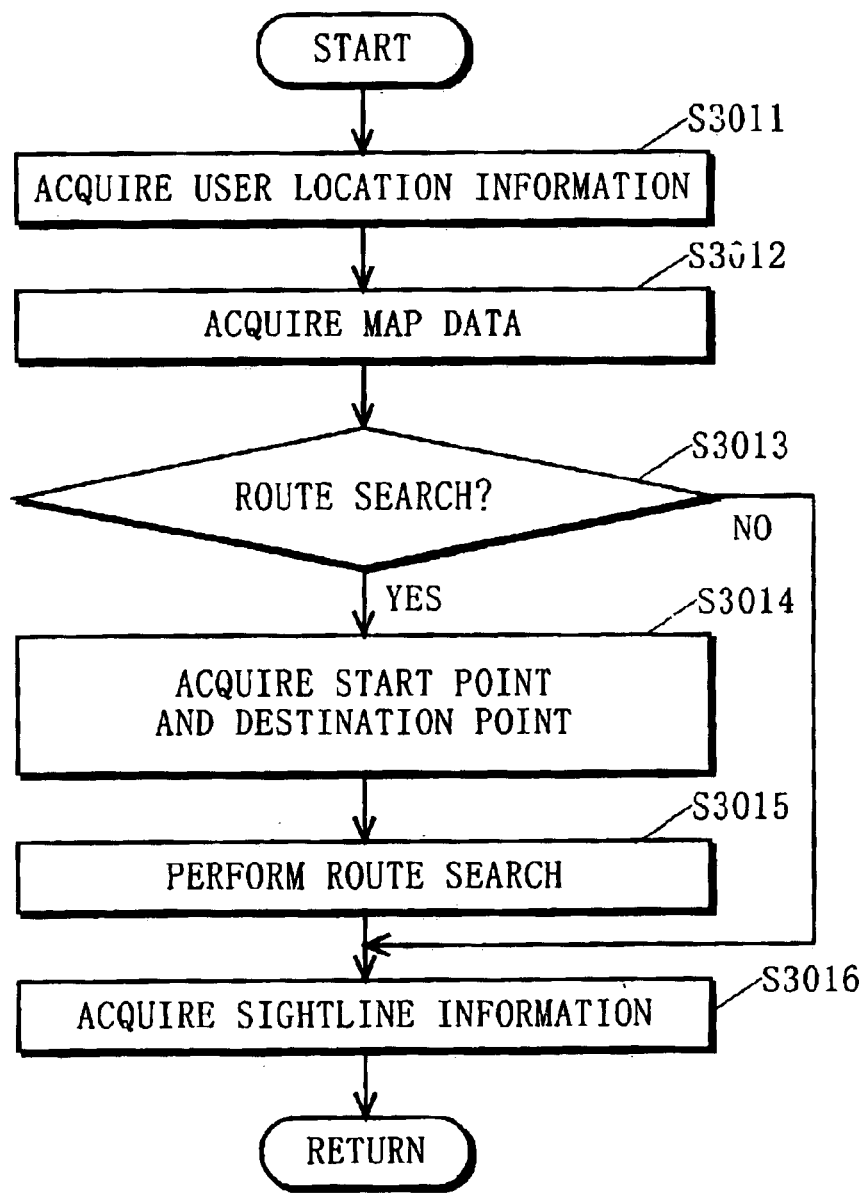
FIG. 4 is a flowchart illustrating the details of step 301 in FIG. 3, First, the CPU 21 acquires user location information from the locator 27 (step S3011). Next, the CPU 21 acquires map data representing a map of a certain tract of land (step S3012). Specifically, the CPU 21 reads the map data from the map database stored in the memory device 25, which is then read into RAM 23. The "certain tract of land"means a neighborhood of the position represented by the user location information acquired at step S3011. The map data acquisition section 11 shown in FIG. 1 is realized by the CPU 21 executing step S3012.

FIG. 4 is a flowchart illustrating the details of step S301 in FIG. 3. First, the CPU 21 acquires user location information from the locator 27 (step S3011). Next, the CPU 21 acquires map data representing a map of a certain tract of land (step S3012). Specifically, the CPU 21 reads the map data from the map database stored in the memory device 25, which is then read into the RAM 23. The "certain tract of land" means a neighborhood of the position represented by the user location information acquired at step S3011. The map data acquisition section 11 shown in FIG. 1 is realized by the CPU 21 executing step S3012.

Next, the CPU 21 determines whether or not to perform a route search (step S3013). A typical process of step S3013 is as follows. A predetermined portion of the input device 24 is provided with a function of commencing a route search. As this portion is operated by the user, the input device 24 generates an instruction signal which instructs a route search to be commenced, and sends the instruction signal to the CPU 21.

If the aforementioned instruction signal has not been received at the time of executing step S3013, the CPU 21 proceeds to step S3016. On the other hand, if the aforementioned instruction signal has been received at the time of executing step S3013, the CPU 21 determines that a route search is to be performed, and proceeds to step S3014. Then, the CPU 21 acquires the coordinates of both a start point and a destination point of a route to be searched for (step S3014). Herein, it is assumed that the start point of the search is a start point of the user. A typical process of step S3014 is as follows. The user inputs a start point and a destination point, one at a time, by operating the input device 24. In response to this user input, the input device 24 generates coordinate information identifying the coordinates of the start point and the destination point, and sends the coordinate information CPU 21. The CPU 21 decodes the received coordinate information to acquire the coordinates of the start point and the destination point therefrom.

In another exemplary process of step S3014, the user operates the input device 24 to input a destination point; the input device 24 generates coordinate information identifying the coordinates of the inputted destination point, and sends the coordinate information to the CPU 21; the CPU 21 acquires the coordinates of the destination point from the received coordinate information; the CPU 21 receives the user location information from the locator 27 and acquires the coordinates indicating the current location of the user; and the CPU 21 uses the acquired coordinates of the current location as the coordinates of the start point.

Next, by using an algorithm based on Dijkstra's algorithm, for example, the CPU 21 performs a route search (step S3015). Based on the road network contained in the map database stored in the memory device 25, a route is retrieved as a link sequence. Through step S3015 as described above, the CPU 21 obtains route information. Finally, the CPU 21 acquires sightline information (step S3016). Specifically, the CPU 21 calculates sightline information based on information concerning a viewpoint, e.g., coordinates of a viewpoint. The coordinates of the viewpoint may be acquired as a result of the user operating the input device 24 to input the viewpoint information. Alternatively, the sightline information may be directly inputted, in the form of information indicating a direction of the sightline, as a result of the user operating the input device 24. "Viewpoint information" is information indicating a viewpoint on the display screen when displaying a 3D image, and is typically represented in the form of coordinates on a map. Thus, the information acquisition process (step S301 of FIG. 3) of acquiring various kinds of information to be used for determining the display mode is completed.

Referring back to FIG. 3, at next step S301, the CPU 21 estimates a displayed state of an object to be displayed on the screen (step S302). The displayed state estimation section 12 shown in FIG. 1 is realized by the CPU 21 executing step S302. In the present embodiment, it is assumed that the displayed objects which are to receive a modification are the road objects and facility objects. Therefore, the displayed state estimation only needs to be performed with respect to the road and facility objects. In the present embodiment, as a displayed state of a displayed object, the CPU 21 estimates the orientation in which the object is displayed. Specifically, the CPU 21 estimates the orientation in which an object is displayed by calculating a horizontal angle θ1 between the sightline and the object displayed in a 3D image. As used herein, the "horizontal angle θ1" is defined as the smaller one of the angles constituted by a line which is parallel to the sightline and a line which is parallel to the orientation of the displayed object. Therefore, θ1 is a numerical value representing an orientation in which an object is displayed on the screen.

Figure 5:
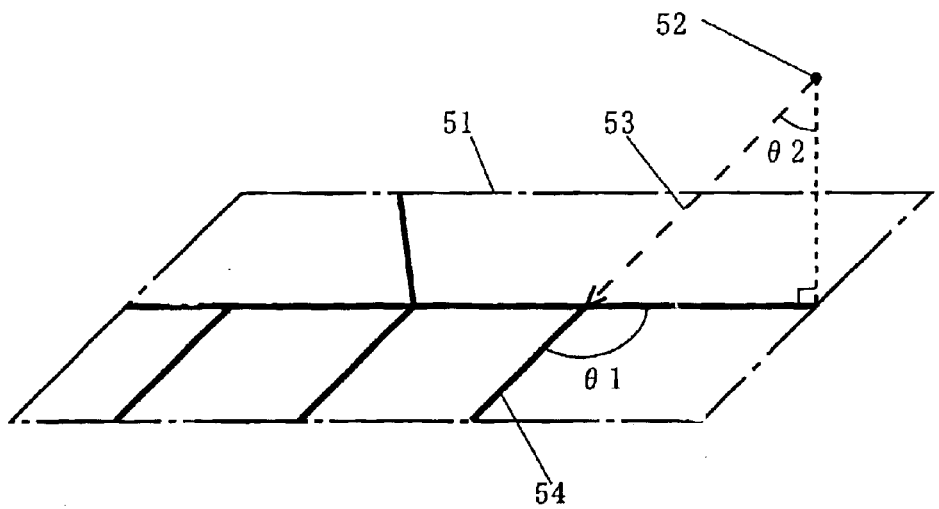
FIG. 5 is a diagram illustrating a horizontal angle θ1 calculated at step S302 in FIG. 3.

FIG. 5 is a diagram illustrating the horizontal angle θ1. In FIG. 5, dot-dash lines represent the expanse of a map 51, and each solid line represents a road on the map 51. The map data representing the map 51 is that which is acquired at step S3012. The viewpoint information representing a viewpoint 52 is that which is acquired at step S3016. According to the above definition, the "horizontal angle θ1 of the road 54" is the smaller one of the angles between the sightline 53 and the road 54 on the ground plane. Also shown in FIG. 5 is a vertical angle θ2, which will be described later.

For example, the horizontal angle θ1 is calculated as follows. In the case of an object representing a road (hereinafter referred to as a "road object"), vector data representing the direction of the road and coordinates indicating the positions of both ends of the road are contained as link data in commonly-used map data; therefore, a vector representing the direction of the road can be easily obtained therefrom. In the case of a "train station" or other "facility" object, the map data contains information representing the shape of the facility; therefore, a vector representing the orientation of the displayed object can be calculated from the information representing the shape of the facility. Furthermore, from the sightline information acquired at step S301, a vector representing the direction of the sightline is calculated. By calculating an angle between the vector representing the orientation of the displayed object and the vector representing the direction of the sightline on the ground plane, θ1 is derived. Note that θ1 is defined as an angle within the range from 0° to 90°. Therefore, if a mere calculation of the angle between the vector representing the orientation of the displayed object and the vector representing the direction of the sightline results in a value exceeding 90°, the calculated value needs to be converted to a value within the range from 0° to 90° as appropriate.

In steps S303 to S305 following step S302, the CPU 21 performs a process of determining the actual display mode, i.e., a display mode in which a display object is actually displayed on the screen. The display mode determination section 13 shown in FIG. 1 is realized by the CPU 21 executing steps S303 to S305. First, with respect to a displayed object whose displayed state has been estimated at step S302, the CPU 21 calculates a deformation degree D1 from the horizontal angle θ1 (step S303). In the present embodiment, the deformation degree D1 is employed as a parameter determining the display mode. Specifically, the deformation degree indicates a degree of modification to be applied to the default display mode in deriving the actual display mode. The greater the deformation degree is, the greater the degree of modification to be applied is.

Figure 6:
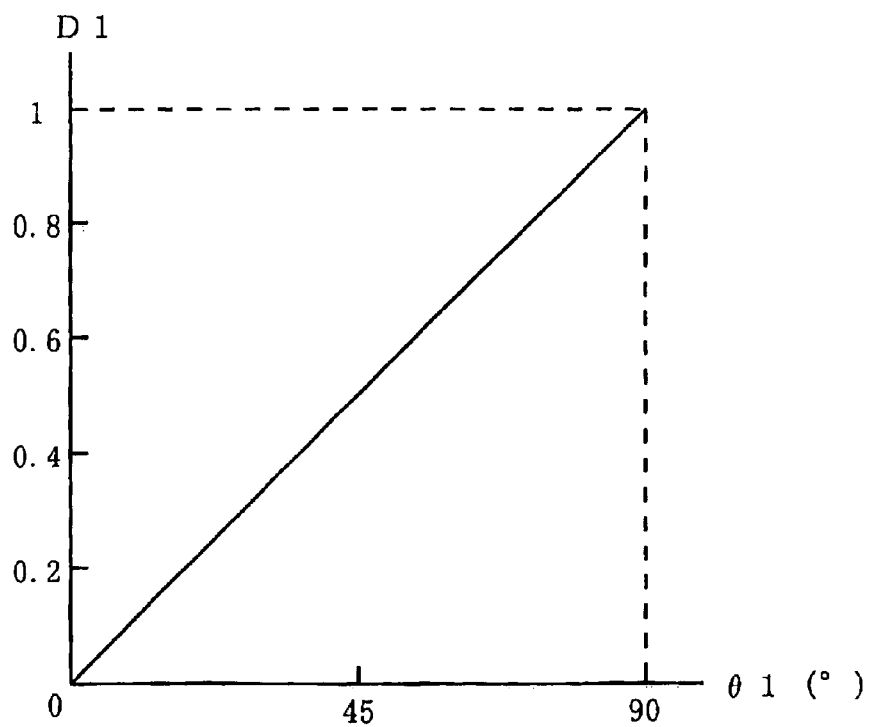
FIG. 6 is a graph illustrating a relationship between a horizontal angle θ1 and a deformation degree D determined on the basis thereof according to the first embodiment of the present invention.

The deformation degree D1 is determined in accordance with a predetermined relationship between θ1 and D1. FIG. 6 is a graph illustrating a relationship between the horizontal angle θ1 and the deformation degree D determined on the basis thereof according to the first embodiment of the present invention. As shown in FIG. 6, the relationship between θ1 and D1 is prescribed so that D1 increases in proportion with an increase in θ1 from 0° to 90°.

After step S303, the CPU 21 determines whether D1=0 is satisfied for the displayed object whose D1 has been calculated at step S303 (step S304). If D1=0, the CPU 21 proceeds to step S306, i.e., the process of step S305 is omitted, because no deformation process is to be performed. On the other hand, if D1=0 is not satisfied, the CPU 21 determines a modification amount for the displayed object which has been subjected to the determination of step S304 (step S305). Through steps S302 to S305 above, the display data is modified so that a selected displayed object(s) among the road objects contained in the 3D map will be displayed with an increased width. Specifically, the CPU 21 performs a deformation process for the selected displayed object(s) in accordance with the deformation degree D1 calculated at step S303. Hereinafter, the deformation process will be specifically described.

In the deformation process according to the present embodiment, the actual display mode is determined by changing the width Wr of the displayed object from that defined under the default display mode. The width Wr of the displayed object is determined in accordance with eq. 1:

$$Wr = Wd \times (1 + D1) \qquad \text{eq. 1.}$$

Eq. 1 is a formula for determining an actual display mode from a default display mode by changing the width of a displayed object. In eq. 1, Wr denotes the width of an object displayed in the actual display mode; Wd denotes the width of the displayed object which is predefined under the default display mode; and D1 denotes the deformation degree as described above. The width Wd of the displayed object in the default display mode is contained in the map data. Thus, Wr can be obtained on the basis of Wd as contained in the map data and D1 as calculated at step S303.

After the display mode determination process from steps S303 to S305, the CPU 21 performs a displayed image generation process at steps S306 and S308. The displayed image generation section 14 shown in FIG. 1 is realized by the CPU 21 executing steps S306 and S308. First, the CPU 21 generates shape data for the displayed object which has been subjected to the determination of step S304 (step S306). As used herein, the "shape data" is data representing the shape of an object to be displayed as a 3D image. For example, in the case of a road or route object, the shape data is generated by adding width information to the road or route data contained in the map data acquired at step S3012, where Wr as determined at step S305 is employed as the width information. In the case where the displayed object in the map data is expressed in terms of shape information, shape data is generated from the shape information contained in the map data, with the width being changed to Wr.

Next, the CPU 21 determines whether or not shape data has been generated for every object to be displayed (step S307). If it is determined that shape data has not been generated for every displayed object to be displayed, the CPU 21 returns to step S302, and repeats the series of processes from steps S302 to S306 with respect to any displayed object for which shape data has not been generated. On the other hand, if it is determined that shape data has been generated for all of the objects to be displayed, the CPU 21 combines units of shape data for the respective displayed objects generated at step S306, thereby generating image data representing the overall displayed image (step S308). The generated image data is sent from the CPU 21 to the output device 26. The output device 26 performs a displaying process in accordance with the received image data, whereby a 3D map is displayed on the screen.

Figure 7:
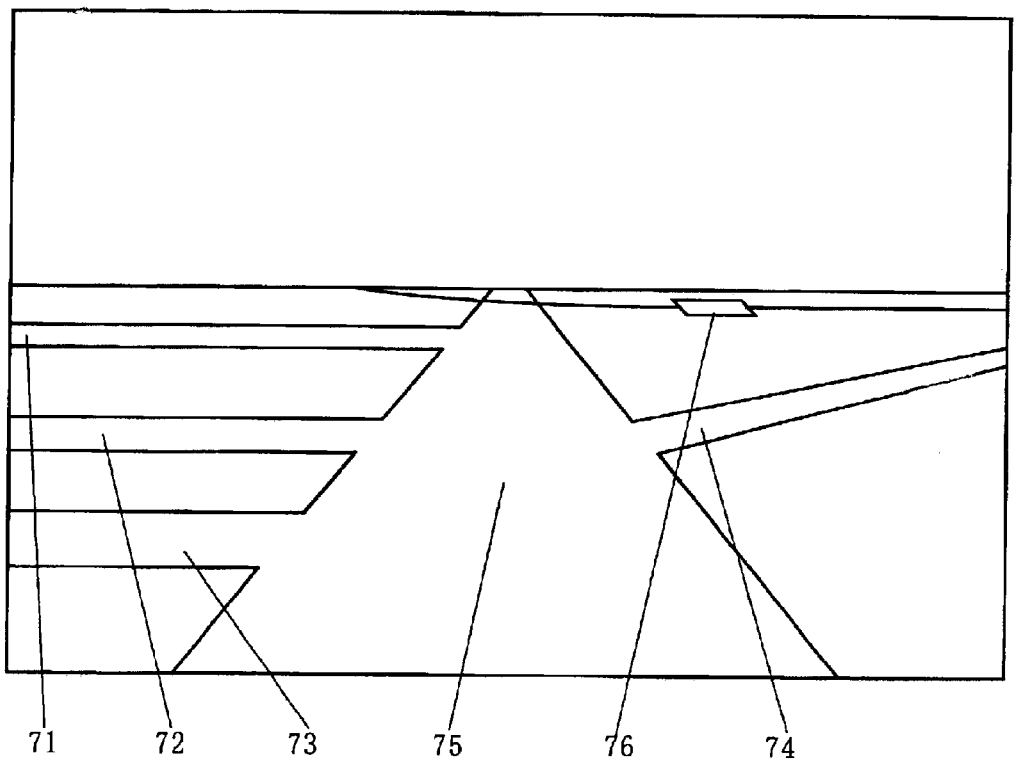
FIG. 7 is a diagram illustrating an example of a 3D map displayed in accordance with the operation according to the first embodiment of the present invention.
Figure 21:
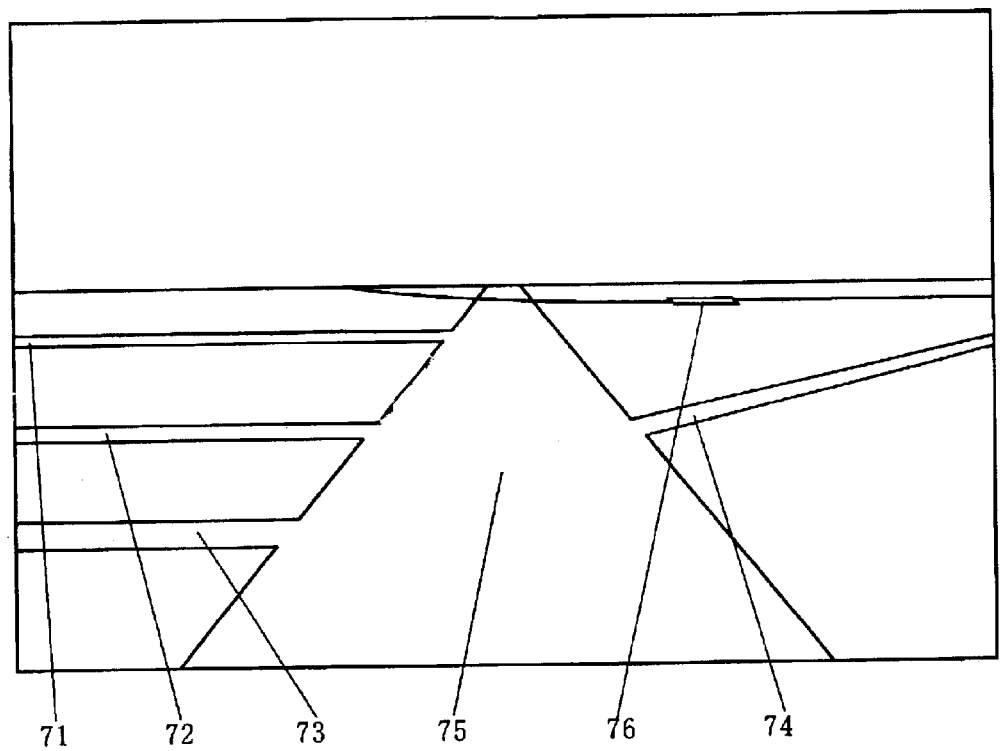
FIG. 21 is a diagram illustrating an example of a 3D map displayed by a conventional 3D map displaying apparatus.

FIG. 7 is a diagram illustrating an example of a 3D map displayed in accordance with the operation according to the first embodiment of the present invention. Note that any exemplary 3D map image illustrated in a figure (including FIG. 7) which is cited in the following description of the present embodiment is based on the 3D map image shown in FIG. 21, with modifications being made therefrom. While displayed objects (e.g., a train station) may occasionally be omitted from the following figures, it is to be understood that such omissions are made for clarity's sake and unrelated to the process of the present invention, unless otherwise specified.

In FIG. 7, roads 71 to 75 and a train station 76 are selectively subjected to a deformation process. It is assumed herein that the deformation degree D1 is calculated based on the relationship shown in FIG. 6. Assuming that θ1 is calculated to be 90° for the roads 71 to 73 and the train station 76, the relationship shown in FIG. 6 dictates that D1=1. Therefore, from eq. 1, the road width Wr under the actual display mode is calculated to be 2·Wd. Thus, the roads 71 to 73 and the train station 76 are displayed with their widths being doubled from those under the default display mode. Assuming that θ1 is calculated to be 45° for the road 74, Wr is calculated to be 1.5·Wd from FIG. 6 and eq. 1. Thus, the road 74 is displayed with a width which is 1.5 times as large as that under the default display mode. On the other hand, assuming that θ1 is calculated to be 0 for the road 75, then D1=0, i.e., no deformation process is performed. Therefore, the road 75 is displayed with the same width as that under the default display mode.

Thus, in accordance with the navigation apparatus of the first embodiment, roads extending along the right-left direction are displayed on the screen with a greater road width than a road width that is derived based on map data from which a 3D map is displayed. Specifically, any displayed object which is determined as being oriented in the lateral direction (i.e., whose θ1 is relatively close to 90°) is displayed with a width greater than a predetermined value, whereas any displayed object which is determined as being oriented in the top-bottom direction (i.e., whose θ1 is relatively close to 0°) is displayed without a substantial increase in its width from a predetermined value. Thus, those displayed objects whose recognizability will deteriorate (i.e., become more difficult to recognize) as a result of being displayed as 3D images are displayed with a particular emphasis. Accordingly, not only the visual recognition of displayed objects suffering from deteriorated recognizability is enhanced, but the entire screen becomes easier to view.

Although the navigation apparatus according to the first embodiment is illustrated as modifying the display mode of road and facility objects, the displayed objects whose display mode is to be modified are not limited to the above. For example, when a route search is performed, a displayed object representing a route which has been found as a result of the search may be subjected to the aforementioned modification. Moreover, displayed objects representing various kinds of traffic information, such as roads which are congested or under construction, may be subjected to the aforementioned modification.

In the first embodiment, the determination as to whether or not to apply modification is made based on an angle at which an object is displayed, i.e., a horizontal angle between the sightline and a displayed object. In other embodiments, the criterion for determining whether or not to apply modification is not limited to the above. For example, modification may be applied to any roads and routes other than roads which are located where they would be passed through if the vehicle incorporating the navigation apparatus proceeded from the current location in the forward direction. Such a criterion can provide the same effect as that according to the first embodiment for a 3D map as exemplified in FIG. 7.

In the process of determining the actual display mode according to the first embodiment, the navigation apparatus determines the display mode by using a deformation degree. In other embodiments, the display mode maybe determined without using a deformation degree. For example, based on the estimated displayed state, the navigation apparatus may only determine whether to apply deformation or not, and uniformly double the width of any displayed object which is to be deformed.

Figure 8A:
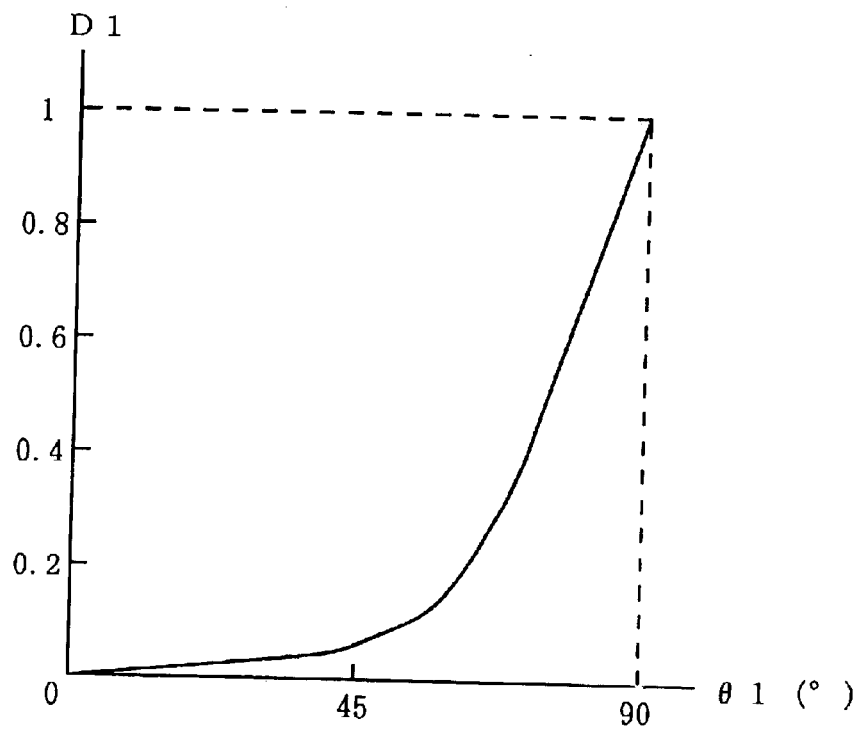
FIGS. 8A and 8B are graphs illustrating other relationships between a horizontal angle θ1 and a deformation degree D determined on the basis thereof according to the first embodiment of the present invention.
Figure 8B:
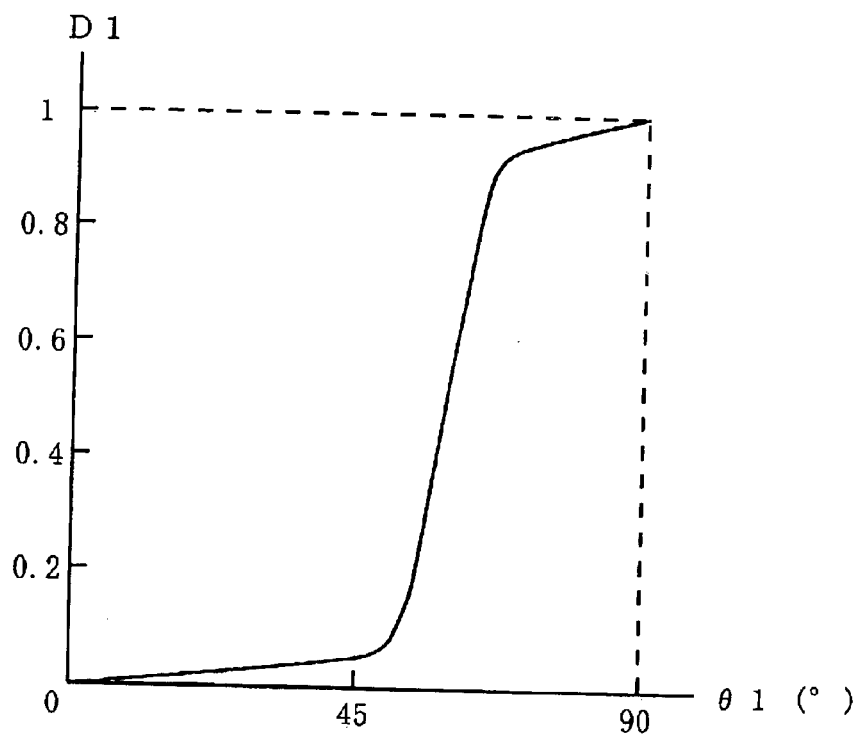

The relationship between θ1 and D1 to be used in the first embodiment is not limited to that shown in FIG. 6; any other relationship which provides a unique definition of D1 may be used. For example, a relationship shown in FIG. 8A or FIG. 8B may be used. FIGS. 8A and 8B are graphs illustrating exemplary relationships between the horizontal angle θ1 and the deformation degree D determined on the basis thereof, which are applicable to the first embodiment of the present invention. In FIG. 8A, D1 is substantially zero while the value of θ1 is relatively small (i.e., the orientation of a displayed object is close to the depth direction of the screen); however, D1 rapidly increases once θ1 exceeds a certain value (i.e., the orientation of a displayed object is close to the right-left direction of the screen). In FIG. 8B, D1 is substantially zero while the value of θ1 is relatively small (i.e., the orientation of a displayed object is close to the depth direction of the screen); however, D1 rapidly increases once θ1 exceeds a certain value, and takes a substantially constant value when θ1 is close to 90°.

Note that displayed objects extending along the top-bottom direction of the screen do not become particularly difficult to recognize when displayed as 3D images in an unmodified manner. Thus, it is considered that displayed objects extending along the top-bottom direction of the screen do not require much deformation. In fact, deforming such objects may be even more problematic because of possible interferences between the deformed objects and the objects displayed in the neighborhood of the deformed objects. Therefore, by ensuring that substantially no deformation is performed when θ1 is small as shown in FIG. 7, the problems associated with performing such unnecessary deformations can be prevented.

In the first embodiment, the actual display mode is determined by using a deformation degree D1 which is determined based on the horizontal angle θ1. However, the present invention is not limited thereto. The actual display mode may be determined based not only on the horizontal angle θ1 but also on other information. Hereinafter, a display mode determination method according to a variant of the first embodiment will be described.

In the first variant, a vertical angle θ2 is employed in addition to the horizontal angle θ1. As shown in FIG. 5, the vertical angle θ2 is an angle between a normal of the ground plane and the sightline. Therefore, θ2=0° if the sightline is taken from directly above the map. The vertical angle θ2 is also used to determine a deformation degree (referred to as the "vertical deformation degree D2"). Although it is conveniently assumed herein that θ2 and D2 have the same relationship as that between θ1 and D1 as shown in FIG. 6, any relationship which provides a unique definition of D2 based on θ2 can be used. Assuming that road width is the subject of modification, the display mode of a displayed object may be determined in accordance with eq. 2:

$$Wr = Wd \times (1+D1) \times (1+D2) \qquad \text{eq. 2.}$$

Although eq. 2 is a formula for determining the road width Wr, a similar formula can also be used for determining the width of displayed objects such as facility objects.

Next, an operation of the first variant of the present navigation apparatus will be described. Since the processing procedure by the CPU 21 is similar to the process shown in FIG. 3, only the differences therefrom will be described. In the deformation degree calculation process of step S303 in FIG. 3, the CPU 21 calculates the deformation degree D1 and the vertical deformation degree D2. Next, in the determination process of step S304 in FIG. 3, the CPU 21 determines whether D1=0 is satisfied or not. If D1=0, the CPU 21 proceeds to step S306. If D1=0 is not satisfied, the CPU 21 performs a deformation process in accordance with eq. 2, based on D1 and D2. The processes of steps S301 and S302 and the process from step S306 are similar to those in the first embodiment.

Figure 9A:
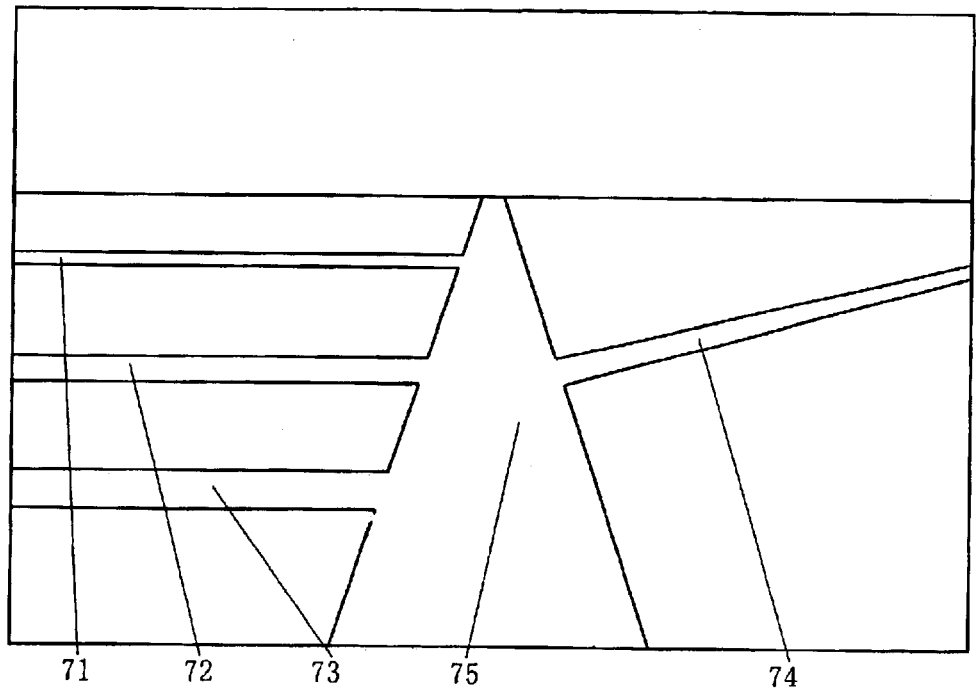
FIGS. 9A and 9B are diagrams illustrating displayed images according to a first variant of the first embodiment of the present invention.
Figure 9B:
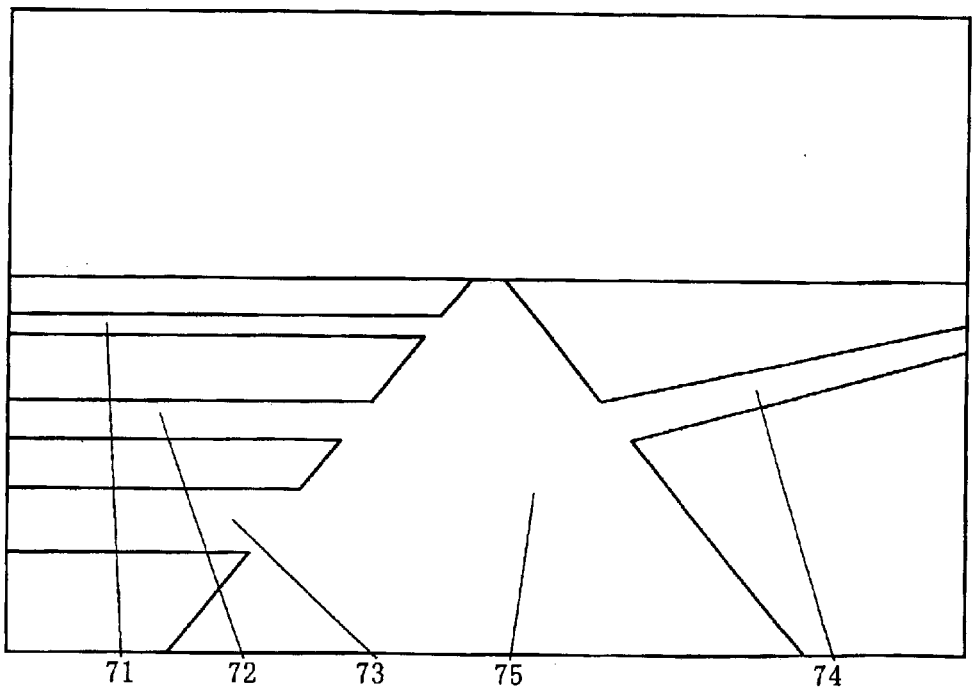

FIGS. 9A and 9B are diagrams illustrating displayed images according to the first variant of the first embodiment of the present invention. It is assumed that θ2=60° in FIG. 9A, and it is assumed that θ2=80° in FIG. 9B. As mentioned above, θ2 and D2 have the same relationship as that shown in FIG. 6, such that D2 increases in proportion with an increase in θ2. Therefore, D2 takes greater values in FIG. 9B than in FIG. 9A, so that, in accordance with eq. 2, the road width Wr in the actual display mode becomes greater in FIG. 9B than in FIG. 9A. As a result, the roads 71 to 74 are displayed with greater road widths in FIG. 9B than in FIG. 9A. As for the road 75, for which no deformation process is performed because D=0, the road width is the same between FIG. 9A and FIG. 9B.

Thus, according to the first variant, the display mode of displayed objects can be changed depending on the vertical angle θ2. Since displayed objects extending along the lateral direction will suffer from greater deteriorations in recognizability as the viewpoint is lowered (i.e., as the depression angle becomes small) in a 3D displayed image, it is particularly useful to ensure that a greater deformation degree is provided as the viewpoint is lowered, as described above.

Next, a second variant of the first embodiment will be described. A display mode determination method according to the second variant employs a distance 1 from a current location to a displayed object in addition to the horizontal angle θ1. The distance 1 is calculated from the user location information acquired at step S3011 in FIG. 4 and the information representing the position of the displayed object contained in the map data acquired at step S3012 in FIG. 4. The distance 1 is used to determine a deformation degree (hereinafter referred to as the "distance deformation degree D3"). Specific examples of the relationship between 1 and D3 will be described later. Assuming that road width is the subject of modification, the display mode of a displayed object may be determined in accordance with eq. 3:

$$Wr=Wd\times(1+D)\times(1+D3) \quad \text{eq. 3}$$

Although eq. 3 is a formula for determining the road width Wr, a similar formula can also be used for determining the width of displayed objects such as facility objects.

The operation of the present navigation apparatus according to the second variant is identical to the operation under the first display mode determination method, except that D3 is calculated instead of D2 and that eq. 3 is employed instead of eq. 2, and the description thereof is therefore omitted.

Figure 10:
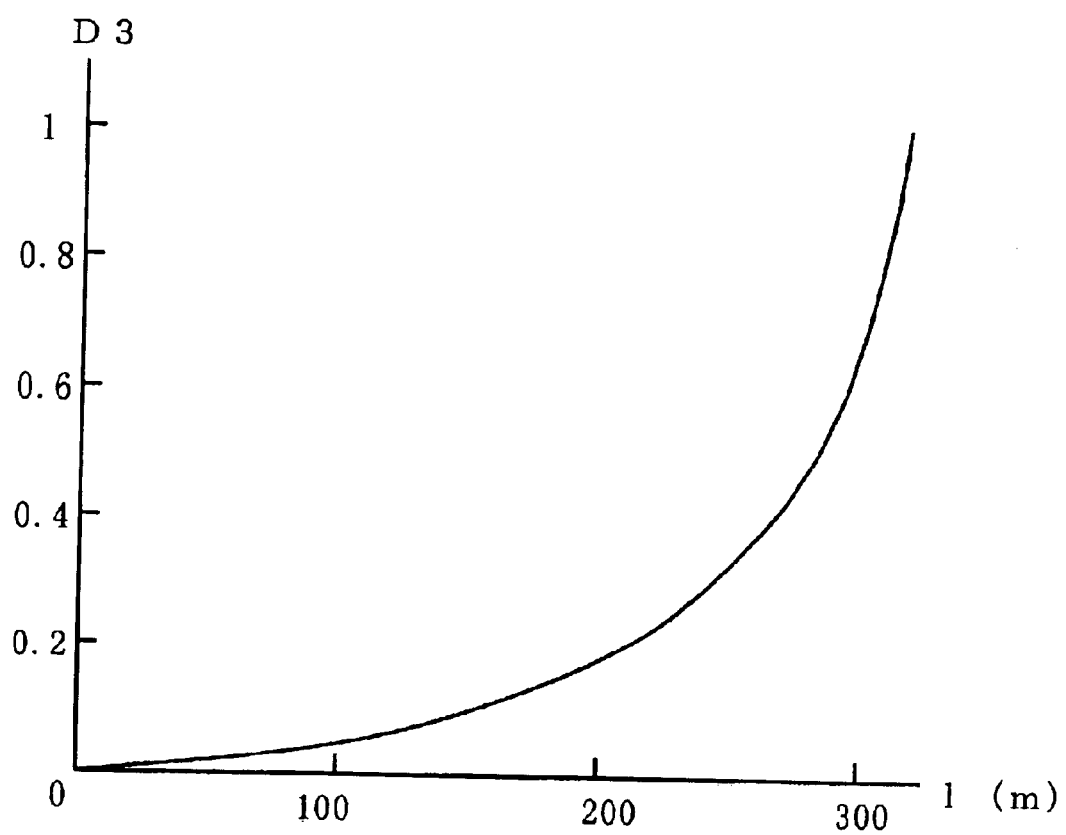
FIG. 10 is a graph illustrating a relationship between a distance 1 and a distance deformation degree D3 according to a second variant of the first embodiment of the present invention.
Figure 11:
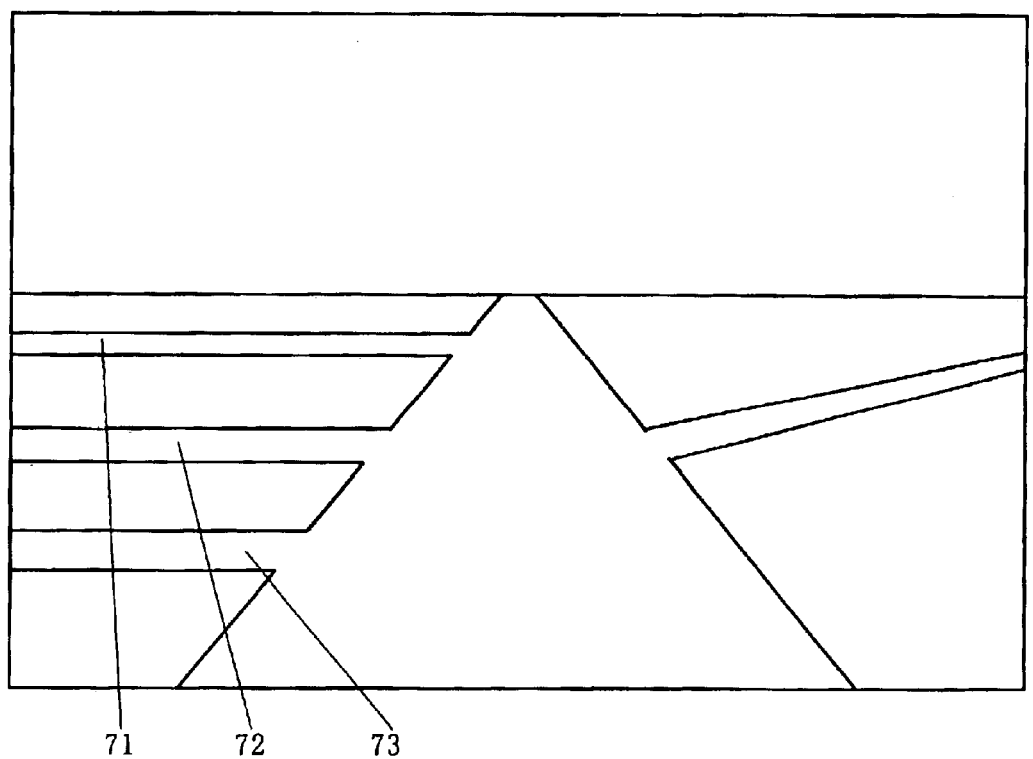
FIG. 11 is an exemplary displayed image when the relationship of FIG. 10 is employed in the second variant.
Figure 1:
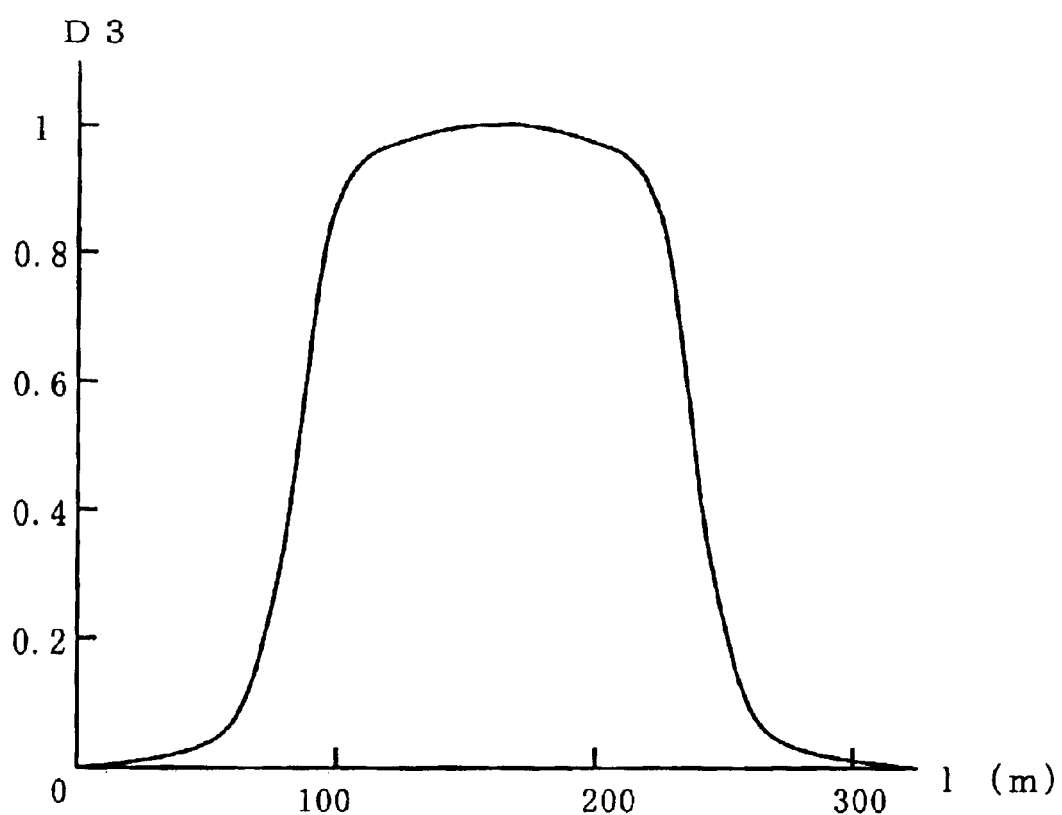

Next, specific examples of the relationship between 1 and D3, and exemplary displayed images under such relationships will be described. FIG. 10 is a graph illustrating a relationship between a distance 1 and a distance deformation degree D3 according to a second variant of the first embodiment of the present invention. FIG. 11 is an exemplary displayed image when the relationship of FIG. 10 is employed in the second variant. In FIG. 10, D3 increases as 1 increases. In this case, as illustrated in FIG. 11, roads which are farther away from the current location are displayed with increased road widths. Accordingly, in FIG. 11, the road 71 is deformed so as to have a much broader width, whereas the road 73 is not substantially deformed, as compared to FIG. 21.

In a 3D displayed image, displayed objects which are relatively close to the current location do not appear too narrow and therefore are not too difficult to recognize, whereas displayed objects which are farther away from the current location may become very difficult to recognize. Therefore, by setting a relationship between D3 and 1 as shown in FIG. 10, the visual recognition of the entire screen can be effectively enhanced.

Figure 13:
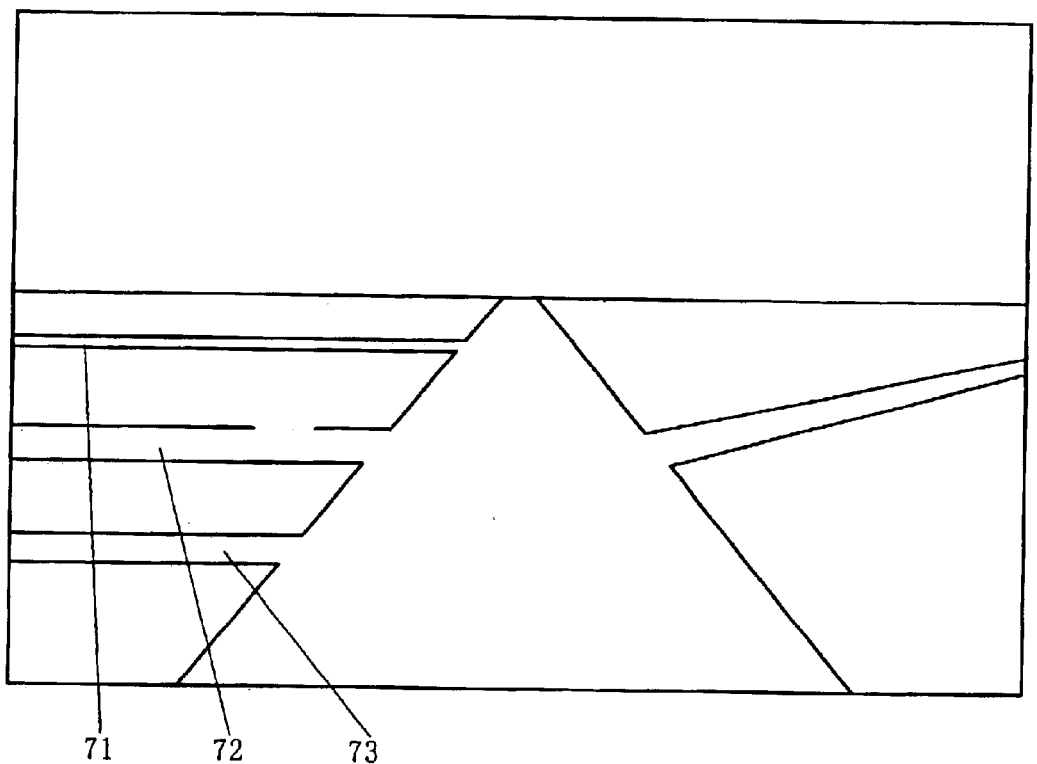
FIG. 13 is an exemplary displayed image when the relationship of FIG. 12 is employed in the second variant.

FIG. 12 is a graph illustrating another relationship between the distance 1 and the distance deformation degree D3 according to the second variant of the first embodiment of the present invention. FIG. 13 is an exemplary displayed image when the relationship of FIG. 12 is employed in the second variant. In FIG. 12, D3 takes a relatively large value while 1 is between about 100 and about 200, and otherwise takes a relatively small value. In this case, as illustrated in FIG. 13, only roads which are within a predetermined range from the current location are displayed with increased road widths. Accordingly, in FIG. 13, the road 72 is deformed so as to have a much broader width, whereas the roads 71 and 73 are not substantially deformed, as compared to FIG. 21.

In a 3D displayed image, objects which are relatively close to the current location do not appear so narrow that they are difficult to recognize, and therefore there is little need to perform a deformation process for such displayed objects. On the other hand, objects which are very far away from the current location do not need to be very easy to recognize because such displayed objects are not of much importance to the user. Therefore, by setting a relationship between D3 and 1 as shown in FIG. 12, the visual recognition of the entire screen can be effectively enhanced because deformation processes are performed only for necessary portions.

Although the display mode is determined based on the vertical angle θ2 or the distance 1 in the above-described variants, it would also be possible to determine a display mode based on a deformation degree which varies depending on the type of the displayed object. As used herein, the "type" of a displayed object may be the type of a road, e.g., a national route or a prefectural route, or the width of the actual road. Specifically, instead of θ2 in eq. 2 above, a deformation degree may employed which takes "1" for a national route, and "0.5" for a prefectural route.

In the first and second variants, the display mode is determined based on a combination of the deformation degree D with another deformation degree, in order to attain a more effective deformation. In other embodiments, a deformation process may be performed only for objects which satisfy a predetermined condition, while also relying on a calculated deformation degree D. For example, in the deformation process of step S305 in FIG. 3, the CPU 21 may perform a deformation process only when the displayed object is a road of a particular type. In this case, the map data needs to contain information indicating road types. Alternatively, by relying on the route information, the CPU 21 may perform a deformation process only for roads which are present on a route that has been found. Alternatively, by relying on the user location information, a deformation process may be performed only for roads which are connected to the closest intersection to the current location. Furthermore, it may be ensured that a deformation process is performed only if the parameters θ2 and/or 1 employed in the first and second variants satisfy predetermined conditions.

Second Embodiment

Figure 14:
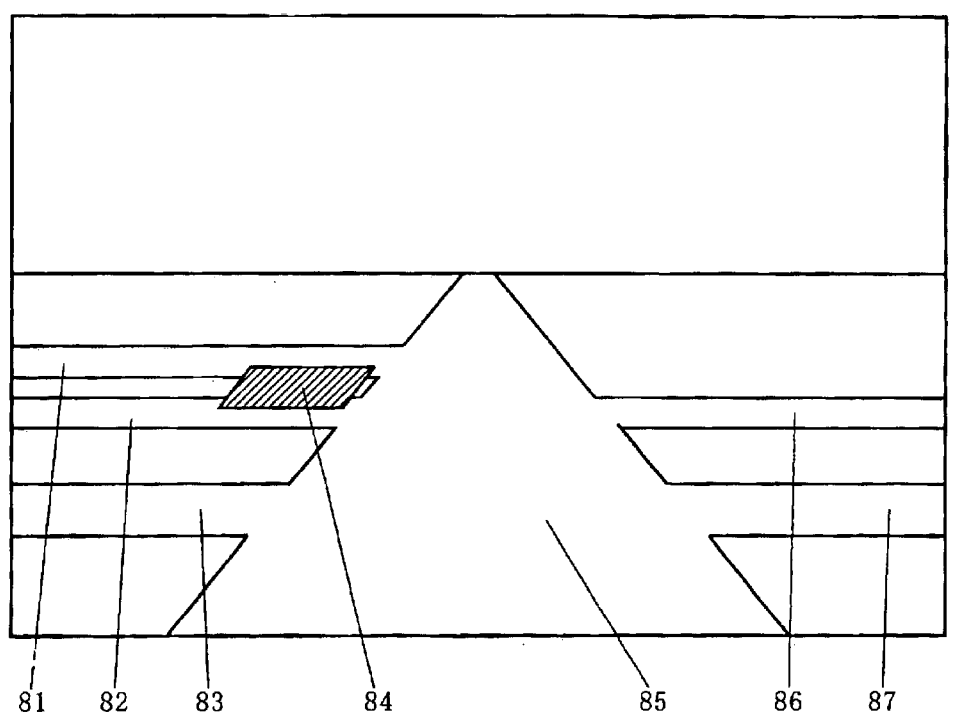
FIG. 14 is an exemplary displayed image where a displayed object interferes with other displayed objects.

Next, a second embodiment of the present invention will be described. In the first embodiment, a displayed object may interfere with another displayed object as a result of applying modification to the default display mode. FIG. 14 is an exemplary displayed image where a displayed object interferes with other displayed objects. In FIG. 14, a deformation process is performed for roads 81 and 82 so as to increase the width thereof, so that the roads 81 and 82 and a green area 84 overlap one another. Thus, in the first embodiment, where a deformation process is performed irrespective of the displayed states of any other displayed objects, it is possible for two or more displayed objects to interfere with one another as shown in FIG. 14. The second embodiment provides a further improvement over the first embodiment.

Figure 15:
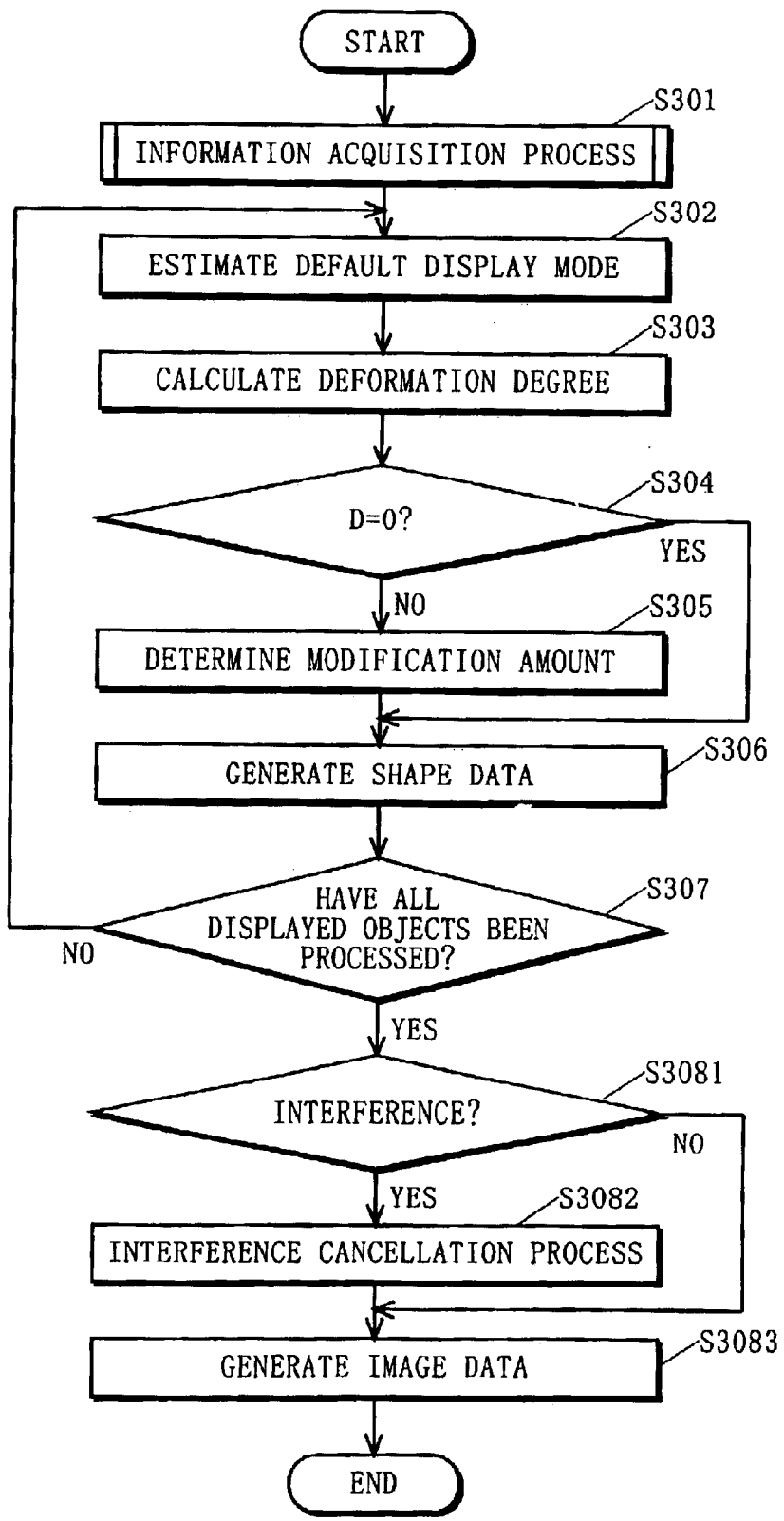
FIG. 15 a flowchart illustrating a processing procedure of a CPU 21 according to the second embodiment of the present invention.

Next, an operation of a navigation apparatus according to the second embodiment will be described. FIG. 15 a flowchart illustrating a processing procedure of the CPU 21 according to the second embodiment of the present invention. The navigation apparatus according to the second embodiment has a structure similar to that of the navigation apparatus according to the first embodiment as shown in FIG. 2. The operation according to the second embodiment is identical to the operation according to the first embodiment except for step S308 in FIG. 3. Therefore, the descriptions of the processes up to step S307 are omitted, and only the subsequent processes will be described below.

In FIG. 15, after step S307, the CPU 21 determines whether there is a site having two objects interfering with one another (step S3081). The determination of step S3081 is made by generating image data from the shape data of the respective objects generated at step S306. If there is no such interfering site, the CPU 21 proceeds to step S3083.

On the other hand, if there is an interfering site, the CPU 21 performs an interference cancellation process (step S3082) Specifically, the CPU 21 modifies one of the two interfering objects that is not subjected to the deformation process of step S306 in such a manner that the interference is canceled. Referring to FIG. 14, in order to cancel the interference between the road 81 and the green area 84, for example, the CPU 21 modifies the green area 84 (because this object is not the subject of the deformation process). Similarly, in order to cancel the interference between the road 82 and the green area 84, the green area 84 is modified.

Next, the CPU 21 combines units of shape data for the respective objects, thereby generating image data representing the overall displayed image (step S3083). The process of S3083 is similar to the process of step S308 in FIG. 3.

Figure 16:
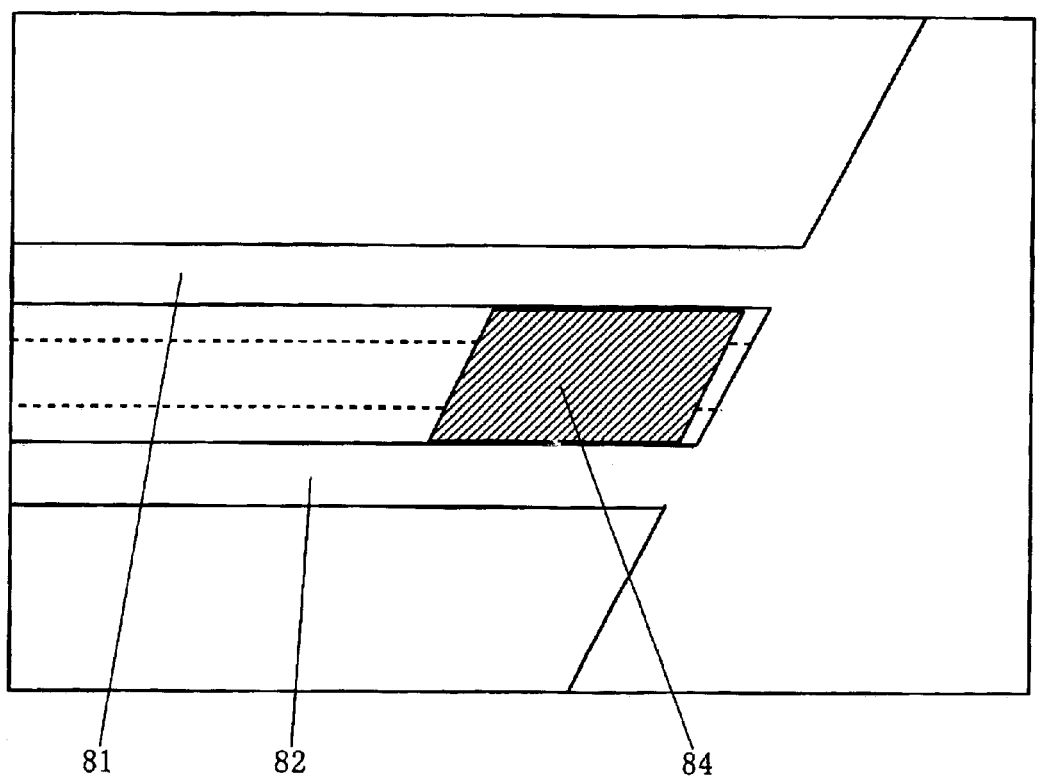
FIG. 16 is a diagram illustrating an example of a 3D map displayed in accordance with the operation according to the second embodiment of the present invention.

FIG. 16 is a diagram illustrating an example of a 3D map displayed in accordance with the operation according to the second embodiment of the present invention. Note that FIG. 16 only shows an image of the neighborhood of the interfering site in FIG. 14. The dotted lines in FIG. 16 show how the objects would be displayed before performing the interference cancellation process. As shown in FIG. 16, the width of the interfering green area 84 (i.e., an object which is not the subject of the deformation process) is adjusted so as not to interfere with the roads 81 and 82.

Figure 17A:
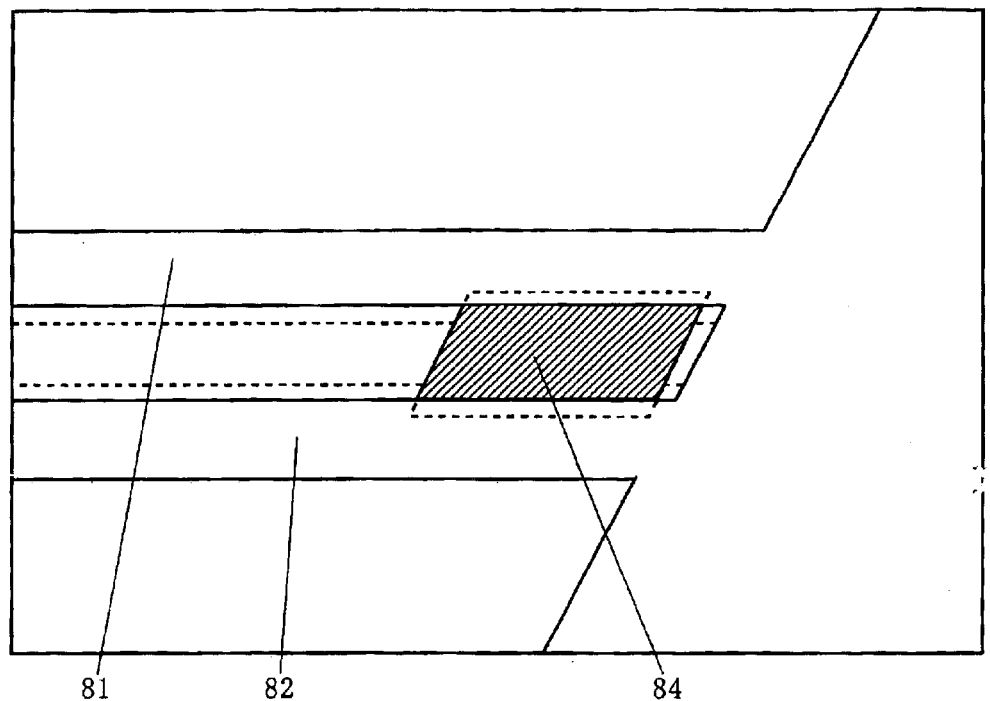
FIGS. 17A and 17B are diagrams illustrating examples where other interference canceling methods are used in the second embodiment of the present invention.
Figure 17B:
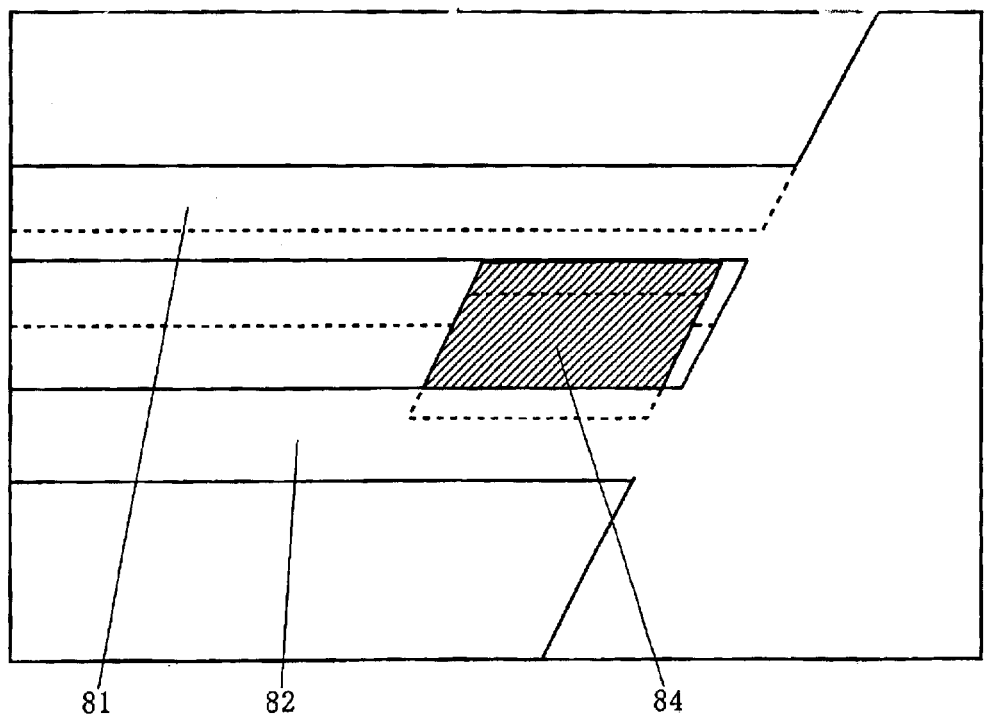

The specific method for canceling interference is not limited to the above, and any other method may be used. FIGS. 17A and 17B are diagrams illustrating examples where other interference canceling methods are used in the second embodiment of the present invention. Note that, similarly to FIG. 16, each of FIGS. 17A and 17B only shows an image of the neighborhood of the interfering site in FIG. 14, and the dotted lines show how the objects would be displayed before performing the interference cancellation process. FIG. 17A illustrates an interference canceling method where both of the interfering objects are modified. In this case, the CPU 21 calculates a middle point between the two interfering objects, and modifies each of the two objects so as not to be drawn beyond the calculated middle point. FIG. 17B illustrates another interference canceling method where interfering objects are displayed so as to be shifted in a direction away from the current location. For example, in the case of FIG. 17B, the green area 84 is first calculated to be displayed in a shifted position not interfering with the road 82, and then the road 81 is calculated to be displayed in a shifted position not interfering with the green area 84.

There are further alternative interference cancellation processes. For example, between the two interfering objects, the object which has been subjected to the deformation process may be modified. Alternatively, one of the two interfering objects may simply be prevented from being displayed, rather than modified, to cancel interference.

Furthermore, one of the two interfering objects may be selected for modification depending on priorities. In this case, objects having greater areas may be assigned with higher priorities, or objects which have their name data contained in the map data maybe assigned with higher priorities. As a result, objects which are likely to serve as landmarks will be allowed to display as large images without being modified. Alternatively, priorities may be preassigned depending on the type of objects. For example, parks and green areas, which are likely to serve as landmarks, may be assigned with higher priorities, whereas normal houses may be assigned with lower priorities. Effects similar to those described above can also be attained by such alternative arrangements.

Third Embodiment

Next, a third embodiment of the present invention will be described. According to a method of modifying the display mode according to the third embodiment, objects representing routes (hereinafter referred to as "route objects") are modified so as to appear "upright" in the 3D displayed image, unlike in the first and second embodiments. The navigation apparatus according to the third embodiment has a structure similar to that of the navigation apparatus according to the first embodiment as shown in FIG. 2. The operation according to the third embodiment is identical to the operation according to the first embodiment except for steps S302, S303, and S305 in FIG. 3. Therefore, steps S302 to S305 will be specifically described below. In the third embodiment, it is assumed for the sake of conciseness that route objects are the only displayed objects that may be subjected to a deformation process.

According to the third embodiment, in the displayed state estimation process of step S302 in FIG. 3, the CPU 21 estimates whether the route object to be displayed extends along a branch road or along a road existing beyond a branch road. As used herein, a "branch road" is a road connected to the reference road, such that the smaller one of the angles between itself and the reference road is equal to or greater than a predetermined value. As used herein, the "reference road" is a road which passes below the viewpoint in a 3D map and extends along the depth direction (i.e., extends along the top-bottom direction of the screen). Therefore, neither the reference road, nor any route object extending along the reference road, needs to be deformed. Thus, the process of step S302 determines whether a deformation process is to be performed or not, based on the determination as to whether the route object extends along the reference road or not. In other words, at step S302, the CPU 21 determines whether or not the route object to be displayed exists beyond an intersection at which a branch road is connected to the reference road ("hereinafter referred to as a "deformation-start intersection").

In the present embodiment, the determination concerns whether the route object to be displayed exists beyond a deformation-start intersection or not. Therefore, not only route objects extending along branch roads, but all route objects that exist beyond a deformation-start intersection are the subject of deformation. In other embodiments, however, the determination may only concern whether the route object to be displayed extends along a branch road or not, in which case not all of the route objects that exist beyond a deformation-start intersection are the subject of deformation.

The determination of a "branch road" may be made as follows. For example, if the smaller one of the angles between a "reference road" link and a "road link" connected there to exceeds a predetermined threshold value, then such a road may be determined as a "branch road". Alternatively, if the angle between the sightline and a road connected to the reference road (corresponding to the horizontal angle θ1 in the first embodiment) exceeds a predetermined threshold value, such a road may be determined as a "branch road". The present embodiment is indifferent as to the detailed algorithm of such determination.

Next, the CPU 21 calculates a deformation degree D in the deformation degree calculation process of step S303. In the third embodiment, if the route is estimated to be a route extending beyond a deformation-start intersection at step S302, the deformation degree D is determined to be "1". On the other hand, if the route is estimated not to be a route extending beyond a deformation-start intersection, the deformation degree D is determined to be "0" (i.e., no deformation process is performed). In other words, a route that extends along a road which is determined as existing beyond a deformation-start intersection (e.g., a branch road) will have its display mode modified. On the other hand, a route that extends along a road which is determined as not existing beyond a deformation-start intersection (e.g., the reference road) will not have its display mode modified.

In the deformation process of step S305, the CPU 21 modifies some route objects so as to appear upright. Specifically, the CPU 21 performs the upright modification as the deformation process if the deformation degree D calculated at step S303 is "1". On the other hand, if D=0, the CPU 21 does not perform the upright modification.

Figure 18:
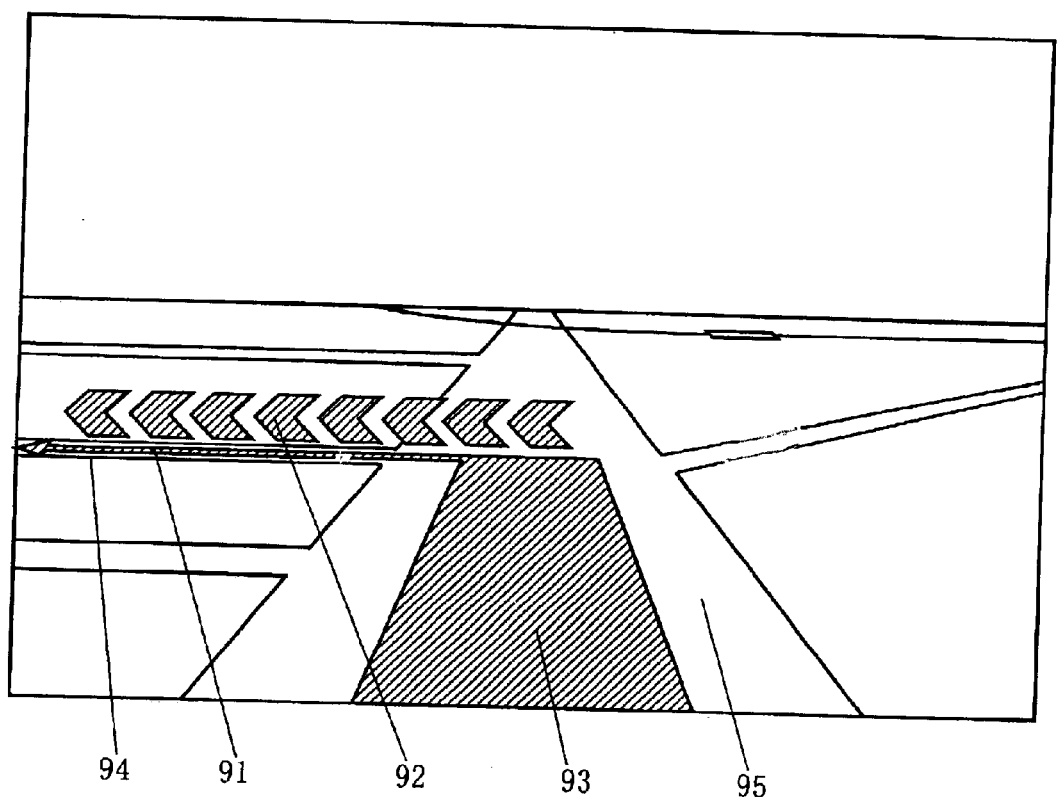
FIG. 18 is a diagram illustrating an example of a 3D map displayed in accordance with the operation according to the third embodiment of the present invention.

Next, an operation according to the third embodiment will be described with respect to specific examples. FIG. 18 is a diagram illustrating an example of a 3D map displayed in accordance with the operation according to the third embodiment of the present invention. In FIG. 18, route objects 91 to 93 are displayed.

In FIG. 18, the route corresponding to the road 95 is estimated at step S302 not to be a route extending beyond a deformation-start intersection. In other words, the road 95 is a reference road. Therefore, at step S303, D is calculated to be "0" for the route corresponding to the road 95. Thus, at step S305, the route corresponding to the road 95 does not receive upright modification, but is rather drawn on the ground plane. In other words, a route object corresponding to the road 95 is displayed in the default display mode (i.e., without being modified), resulting in the route object 93. Thus, in FIG. 18, any displayed object which lies below the viewpoint and extends along the top-bottom direction of the screen is determined as easy to recognize (i.e., not suffering from deteriorated recognizability), and is drawn on the ground plane.

On the other hand, the route corresponding to the road 94 is estimated at step S302 to be a route extending beyond a deformation-start intersection. In other words, the road 94 is a branch road. Therefore, at step S303, the deformation degree D is calculated to be "1" for the route corresponding to the road 94. As a result, at step S305, the route corresponding to the road 94 receives upright modification. Thus, route objects corresponding to the road 94 are modified, resulting in the route objects 91 and 92. In the present embodiment, any displayed object extending along a branch road is difficult to recognize (i.e., suffering from deteriorated recognizability), and therefore is drawn so as to have an apparent "height" with respect to the ground plane. As will be appreciated, two kinds of route objects are shown in FIG. 18: displayed objects which are drawn on the ground plane (the route objects 91 and 93), and displayed objects which receive upright modification so as to be drawn above the displayed objects drawn on the ground plane (the route objects 92).

The route objects 92 are displayed along and above the route object 91 in the form of a plurality of arrowheads oriented in the forward direction of the route. As used herein, the "upright modification" causes a displayed object which would be drawn so as to be in the ground plane under the default display mode to be drawn in the "height" direction, rather than in the ground plane. It will be appreciated that each displayed object does not need to have a three-dimensional upright shape. For example, the displayed objects may be planar displayed objects (having a zero dimension along the depth direction of the screen) as exemplified by the arrowhead-shaped route objects 92 shown in FIG. 18.

Thus, in accordance with the navigation apparatus of the third embodiment, a route extending along the right-left direction of the screen is displayed as an upright shape having a "height" with respect to the ground plane. Through such upright modification, visual recognition can be further enhanced as compared to broadening the width of route objects.

Note that applying upright modification to objects which have a planar profile in the real world, e.g., roads, would result in a considerable discrepancy between the displayed map and the actual scene, thus preventing the user from correctly perceiving the displayed image. Accordingly, the upright modification according to the third embodiment is applied to route objects, which are not representations of any objects existing in the real world. This does not create any discrepancies between the displayed map and the actual scene.

The third embodiment illustrates an example where route objects are the subject of upright modification. In other embodiments, any displayed objects other than routes may be the subject of upright modification, e.g., displayed objects representing various kinds of traffic information (such as roads which are congested or under construction). Such traffic information may be represented by displayed objects which have a directional shape (e.g., arrowheads) as shown in FIG. 18. For example, the direction of a congestion (i.e., a congested direction of the traffic) can be indicated by displayed objects representing traffic information. Moreover, "facility" objects (e.g., train stations) may also be the subject of upright modification, such that facility objects which would be drawn in a planar shape under the default display mode receive upright modification in the actual display mode.

In the third embodiment, route objects are displayed in shapes indicating the forward direction of the route, thereby allowing a user to have an intuitive understanding of the forward direction of the route. Furthermore, in the third embodiment, displayed object which have received upright modification are displayed as separate objects which are drawn in addition to the default displayed objects. As a result, the user is enabled to more easily recognize displayed objects than in the case where displayed object which have received upright modification are displayed as integral (i.e. not separate) extensions of the default displayed objects.

In the third embodiment, routes extending beyond a deformation-start intersection receive upright modification, whereas no deformation process is performed for any other routes. In other words, no deformation process is performed for a route which lies straight ahead of the current location, because such a route is to be displayed in the center of a 3D displayed image on the screen, and drawn in a size which does not require any deformation process. Moreover, such a route may interfere with other displayed objects if a deformation process is applied thereto, thus resulting in a deteriorated recognizability. Accordingly, by performing a deformation process only for routes extending beyond a deformation-start intersection, it is ensured that deformation processes are performed only for displayed objects for which deformation processes would be effective. Thus, according to the third embodiment, the visual recognition of displayed objects can be effectively enhanced.

Although the third embodiment illustrates an example where deformation processes are performed only for routes, the third embodiment is also applicable to the case where deformation processes are performed for any other displayed object. In this case, the display mode of any displayed object other than routes may be modified by increasing the width thereof, while the display mode of the route objects may receive applying upright modification.

Although the third embodiment illustrates an example where the deformation degree D takes "1" or "0", in other embodiments, the deformation degree D may be set so as to continuously vary in accordance with the horizontal angle as in the first embodiment. Furthermore, the size, "height", and/or color of a displayed object which receives upright modification may be varied in accordance with the deformation degree D. For example, by ensuring that objects are displayed in more outstanding colors as the deformation degree D increases, it becomes possible to present comprehensible information which would otherwise be difficult for the user to perceive.

Figure 19A:
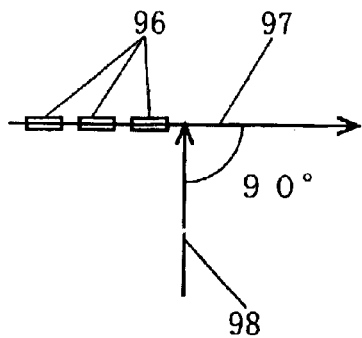
FIGS. 19A, 19B, 19C, and 19D are diagrams illustrating changes in the manner arrowhead-shaped displayed objects shown in FIG. 18 may appear depending on the horizontal angle.
Figure 19B:
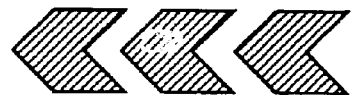

In other embodiments where displayed objects are composed of a plurality of displayed objects as shown in FIG. 18, the number of displayed objects and/or intervals therebetween may be varied in accordance with the deformation degree D. Specifically, the number of arrowhead-shaped displayed objects shown in FIG. 18 and/or intervals therebetween may be varied in accordance with the deformation degree D. FIGS. 19A 19B, 19C, and 19D are diagrams illustrating changes in the manner arrowhead-shaped displayed objects shown in FIG. 18 may appear depending on the horizontal angle. FIG. 19A is a diagram (which is not illustrative of an actual map image) showing a relationship between a sightline and arrowhead-shaped displayed objects representing a route having a horizontal angle of 90°. FIG. 19B is an illustration of an actual image of the route objects 96 shown in FIG. 19A representing a route having a horizontal angle of 90°. In the situation illustrated in FIG. 19A, where a vector 97 representing the direction of the route objects 96 and a vector 98 representing the direction of the sightline constitute a horizontal angle of 90°, the route objects 96 will be displayed in an actual display mode shown in FIG. 19B.

Figure 19C:
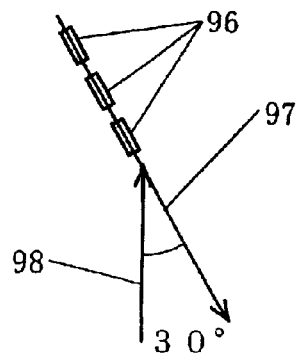
Figure 19D:

On the other hand, FIG. 19C is a diagram (which is not illustrative of an actual map image) showing a relationship between a sightline and arrowhead-shaped displayed objects representing a route having a horizontal angle of 30°. FIG. 19D is an illustration of an actual image of the route objects 96 shown in FIG. 19C representing a route having a horizontal angle of 90°. In the situation illustrated in FIG. 19C, where a vector 97 representing the direction of the route objects 96 and a vector 98 representing the direction of the sightline constitute a horizontal angle of 30°, the route objects 96 will be displayed in an actual display mode shown in FIG. 19D.

By comparing FIG. 19B and FIG. 19D, it will be seen that arrowheads appear differently depending on whether the direction of the route is close to the right-left direction (i.e., close to 90°) or close to the top-bottom direction (i.e., close to 0°). Specifically, the length and intervals of the arrowheads (route objects) 96 are smaller in FIG. 19D than in FIG. 19B, which might lead to a deteriorated recognizability. Therefore, in the case where the direction of the route is close to the top-bottom direction, the length and intervals of arrowheads may be varied in accordance with the deformation degree D. Specifically, the length and intervals of arrowheads may be increased as the deformation degree D decreases, i.e., as the horizontal angle decreases, whereby the visual recognition of the arrowhead-shaped displayed objects can be further enhanced.

Figure 20:
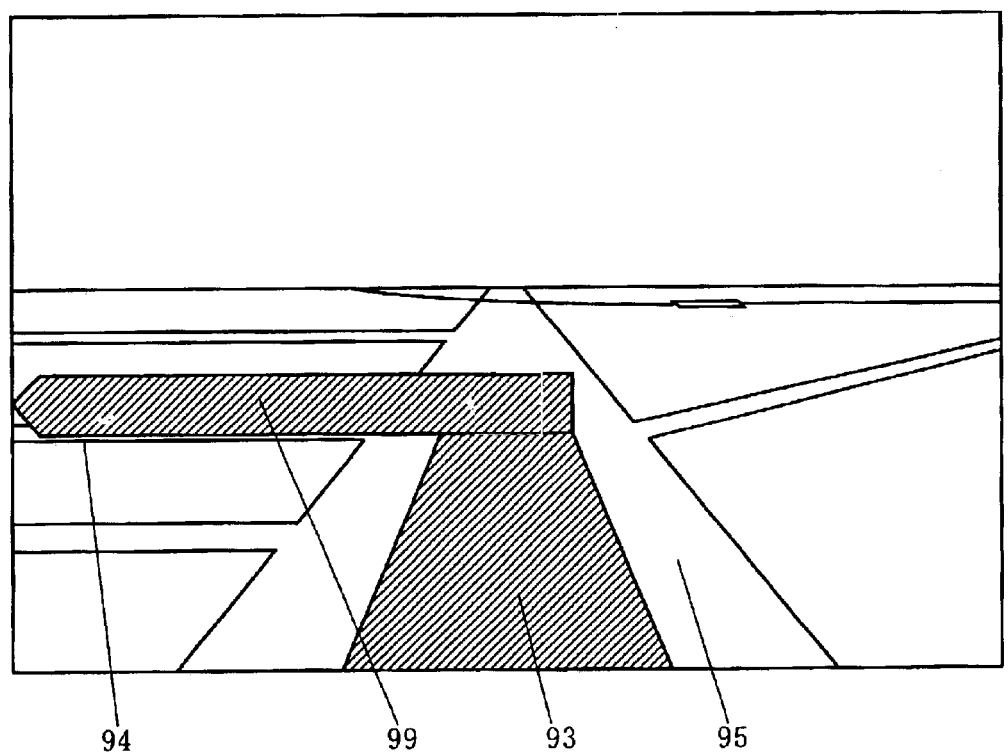
FIG. 20 is a diagram illustrating another example of a 3D map displayed in accordance with the operation according to the third embodiment of the present invention.

In the third embodiment as illustrated in FIG. 18, the route corresponding to the road 94 is displayed as two distinct displayed objects (91 and 92) In other embodiments, the default display mode of a displayed object representing a route may be modified so as to have a "height", so that the displayed object appears as a single upright image. FIG. 20 is a diagram illustrating another example of a 3D map displayed in accordance with the operation according to the third embodiment of the present invention. In FIG. 20, a route object 99 is displayed to indicate a route corresponding to the road 94, instead of the route objects 91 and 92 in the exemplary displayed image shown in FIG. 18. In FIG. 20, the route object 99 conceals a large portion of its corresponding road 94.

By comparing FIG. 18 and FIG. 20, it will be seen that in FIG. 18 where the two distinct displayed objects 91 and 92 are employed, the road 94 is easier to recognize because it is not concealed by the route objects 91 and 92. It would also be easy to recognize any displayed object located behind the road 94. Thus, the user may prefer the displaying method of FIG. 18 employing two distinct displayed objects over the displaying method of FIG. 20 employing a single upright displayed object.

In the third embodiment, the displayed objects (the route objects 92 shown in FIG. 18) which are the subject of upright modification may be arranged vertically with respect to the ground plane, or arranged in a direction perpendicular to the sightline in the 3D displayed image by using the sightline information. In the case where such displayed objects are arranged in a direction perpendicular to the sightline, they can enjoy a certain level of recognizability, irrespective of the depression angle of the display, because of being displayed perpendicular to the sightline regardless of the depression angle taken by the sightline.

While the invention has been described in detail, the foregoing description is in all aspects illustrative and not restrictive. It is understood that numerous other modifications and variations can be devised without departing from the scope of the invention.

What is claimed is:

1. A map displaying apparatus for displaying a 3D map on a screen, the 3D map being displayed as viewed from a viewpoint, comprising:

a regular display section for displaying an object extending along a reference road so as to be drawn on a ground plane of the 3D map, the reference road being a road passing below the viewpoint and extending along a top-bottom direction of the screen; and an emphasis display section for displaying an object extending along a branch road, wherein, the branch road is defined such that a smaller one of angles between the branch road and the reference road is equal to or greater than a predetermined value, and the object extending along the branch road is of a type identical to the type of the object extending along the reference road and comprises an object having a height with respect to the ground plane.

2. The map displaying apparatus according to claim 1, further comprising:
a map data acquisition section for acquiring map data including display data for displaying a 3D map; and
a modification section for modifying display data representing the object extending along the branch road so as to be displayed as an object having a height with respect to the ground plane, wherein,
the regular display section displays the object extending along the reference road by using the display data as acquired by the map data acquisition section, and
the emphasis display section displays the object extending along the branch road by using the display data as modified by the modification section.

3. The map displaying apparatus according to claim 2, further comprising:
a first angle calculation section for calculating an angle between the reference road and a road connected to the reference road; and
a branch road determination section for determining whether the road connected to the reference road is a branch road or not based on the angle calculated by the first angle calculation section.

4. The map displaying apparatus according to claim 2, further comprising:
a second angle calculation section for calculating an angle between a sightline from the viewpoint and a road connected to the reference road, the angle being taken in the ground plane; and
a branch road determination section for determining whether the road connected to the reference road is a branch road or not based on the angle calculated by the second angle calculation section.

5. The map displaying apparatus according to claim 1, wherein the emphasis display section modifies a display mode of the object having the height with respect to the ground plane in accordance with the angle between the reference road and the branch road.

6. The map displaying apparatus according to claim 1, wherein the emphasis display section modifies a display mode of the object having the height with respect to the ground plane in accordance with a depression angle between the sightline and the ground plane.

7. The map displaying apparatus according to claim 6, wherein the emphasis display section modifies the display mode of the object having the height with respect to the ground plane, so that a face of the object having the height with respect to the ground plane is perpendicular to the sightline.

8. The map displaying apparatus according to claim 1, wherein,
the objects are route objects representing a route from a start point to a destination point, and
the emphasis display section displays the route object extending along the branch road so as to comprise an object having a height with respect to the ground plane and indicating a forward direction of the route.

9. The map displaying apparatus according to claim 8, wherein, as the route object, the emphasis display section at least displays a plurality of arrowheads pointing to the forward direction of the route and arrayed above the road.

10. The map displaying apparatus according to claim 1, wherein,
the objects are traffic information objects representing traffic information, and
the emphasis display section displays the traffic information object concerning the branch road so as to comprise an object having a height with respect to the ground plane and indicating a direction relevant to the traffic information.

11. The map displaying apparatus according to claim 10, wherein, as the route object, the emphasis display section at least displays a plurality of arrowheads pointing to the direction relevant to the traffic information and arrayed above the road.

12. A map displaying apparatus for displaying a 3D map on a screen, the 3D map being displayed as viewed from a viewpoint, comprising:
a map data acquisition section for acquiring map data including display data for displaying a 3D map;
a modification section for modifying the display data with respect to a selected one of road objects representing roads contained in the 3D map and/or objects extending along the roads so that the selected object has an increased width; and
a display section for displaying a 3D map containing the selected object whose width has been increased by the modification section.

13. The map displaying apparatus according to claim 12, further comprising an orientation calculation section for calculating orientations in which to display the road objects and/or the objects extending along the roads on the screen,
wherein the modification section determines whether or not to increase the width of an object based on the orientation calculated by the orientation calculation section.

14. The map displaying apparatus according to claim 13, wherein the orientation calculation section calculates as the orientation an angle between a sightline from the viewpoint and each road object and/or object extending along the road, the angle being taken in the ground plane.

15. The map displaying apparatus according to claim 12, further comprising a deformation degree calculation section for calculating a deformation degree to which the display data is modified,
wherein the modification section determines an amount of modification to be applied to the display data in accordance with the deformation degree.

16. The map displaying apparatus according to claim 15, further comprising an orientation calculation section for calculating orientations in which to display the road objects and/or the objects extending along the roads on the screen,
wherein the deformation degree calculation section calculates the deformation degree based on the orientation calculated by the orientation calculation section.

17. The map displaying apparatus according to claim 15, wherein the deformation degree calculation section calculates the deformation degree based on a depression angle between the sightline and the ground plane.

18. The map displaying apparatus according to claim 15, wherein the deformation degree calculation section calculates the deformation degree based on a distance from the viewpoint to the object.

19. The map displaying apparatus according to claim 15, wherein,
the map data contains type information representing a type of each object, and
the deformation degree calculation section calculates the deformation degree based on the type information.

20. The map displaying apparatus according to claim 15, further comprising a route information acquisition section for acquiring route information indicating a route from a start point to a destination point,
- wherein the deformation degree calculation section calculates the deformation degree based on the route information.

21. The map displaying apparatus according to claim 12, further comprising:
- an interference determination section for determining whether there are overlapping objects or not based on the display data modified by the modification section; and
- an interference cancellation section for controlling the display section, when the interference determination section determines that there are overlapping objects, to display at least one of the overlapping objects so as not to overlap the other object.

22. The map displaying apparatus according to claim 21, wherein, when the interference determination section determines that there are overlapping objects, the interference cancellation section changes a width of at least one of the overlapping objects so as not to overlap the other object.

23. The map displaying apparatus according to claim 21, wherein, when the interference determination section determines that there are overlapping objects, the interference cancellation section changes a displayed position of at least one of the overlapping objects so as not to overlap the other object.

24. The map displaying apparatus according to claim 21, wherein, when the interference determination section determines that there are overlapping objects, the interference cancellation section controls the display section to display only one of the overlapping objects.

25. A map displaying method for displaying a 3D map on a screen, the 3D map being displayed as viewed from a viewpoint, comprising:
- a regular display step of displaying an object extending along a reference road so as to be drawn on a ground plane of the 3D map, the reference road being a road passing below the viewpoint and extending along a top-bottom direction of the screen; and
- an emphasis display step of displaying an object extending along a branch road, wherein,
  - the branch road is defined such that a smaller one of angles between the branch road and the reference road is equal to or greater than a predetermined value, and
  - the object extending along the branch road is of a type identical to the type of the object extending along the reference road and comprises an object having a height with respect to the ground plane.

26. The map displaying method according to claim 25, further comprising:
- a map data acquisition step of acquiring map data including display data for displaying a 3D map; and
- a modification step of modifying display data representing the object extending along the branch road so as to be displayed as an object having a height with respect to the ground plane, wherein,
  - the regular display step displays the object extending along the reference road by using the display data as acquired by the map data acquisition step, and
  - the emphasis display step displays the object extending along the branch road by using the display data as modified by the modification step.

27. A map displaying method for displaying a 3D map on a screen, the 3D map being displayed as viewed from a viewpoint, comprising:
- a map data acquisition step of acquiring map data including display data for displaying a 3D map;
- a modification step of modifying the display data with respect to a selected one of road objects representing roads contained in the 3D map and/or objects extending along the roads so that the selected object has an increased width; and
- a display step of displaying a 3D map containing the selected object whose width has been increased by the modification step.

28. The map displaying method according to claim 27, further comprising an orientation calculation step of calculating orientations in which to display the road objects and/or the objects extending along the roads on the screen,
- wherein the modification step determines whether or not to increase the width of an object based on the orientation calculated by the orientation calculation step.

29. A program for causing a computer to display a 3D map on a screen, the 3D map being displayed as viewed from a viewpoint, comprising:
- a regular display step, performed by the computer, of displaying an object extending along a reference road so as to be drawn on a ground plane of the 3D map, the reference road being a road passing below the viewpoint and extending along a top-bottom direction of the screen; and
- an emphasis display step, performed by the computer, of displaying an object extending along a branch road, wherein,
  - the branch road is defined such that a smaller one of angles between the branch road and the reference road is equal to or greater than a predetermined value, and
  - the object extending along the branch road is of a type identical to the type of the object extending along the reference road and comprises an object having a height with respect to the ground plane.

30. The program according to claim 29, further comprising:
- a map data acquisition step, performed by the computer, of acquiring map data including display data for displaying a 3D map; and
- a modification step, performed by the computer, of modifying display data representing the object extending along the branch road so as to be displayed as an object having a height with respect to the ground plane, wherein,
  - the regular display step displays the object extending along the reference road by using the display data as acquired by the map data acquisition step, and
  - the emphasis display step displays the object extending along the branch road by using the display data as modified by the modification step.

31. A program for causing a computer to display a 3D map on a screen, the 3D map being displayed as viewed from a viewpoint, comprising:
- a map data acquisition step, performed by the computer, of acquiring map data including display data for displaying a 3D map;
- a modification step, performed by the computer, of modifying the display data with respect to a selected one of road objects representing roads contained in the 3D map and/or objects extending along the roads so that the selected object has an increased width; and a display step, performed by the computer, of displaying a 3D map containing the selected object whose width has been increased by the modification step.

32. The program according to claim 31, further comprising an orientation calculation step, performed by the computer, of calculating orientations in which to display the road objects and/or the objects extending along the roads on the screen, wherein the modification step determines whether or not to increase the width of an object based on the orientation calculated by the orientation calculation step.

* * * * *